US009078287B2

(12) United States Patent
Khemakhem et al.

(10) Patent No.: US 9,078,287 B2
(45) Date of Patent: Jul. 7, 2015

(54) FIBER TO THE ANTENNA

(75) Inventors: M'hamed Anis Khemakhem, Eden Prairie, MN (US); Scott C. Kowalczyk, Savage, MN (US); Nicholas Torman, Farmington, MN (US); Dominic J. Louwagie, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 789 days.

(21) Appl. No.: 13/087,022

(22) Filed: Apr. 14, 2011

(65) Prior Publication Data

US 2011/0262146 A1    Oct. 27, 2011

Related U.S. Application Data

(60) Provisional application No. 61/324,245, filed on Apr. 14, 2010.

(51) Int. Cl.
*G02B 6/36* (2006.01)
*G02B 6/00* (2006.01)
*H04B 10/00* (2013.01)
*H04M 1/00* (2006.01)
*H04W 88/10* (2009.01)
*H04B 10/80* (2013.01)
(Continued)

(52) U.S. Cl.
CPC ............. *H04W 88/10* (2013.01); *H04B 10/801* (2013.01); *G02B 6/4249* (2013.01); *G02B 6/4246* (2013.01); *G02B 6/4207* (2013.01); *H04W 88/085* (2013.01)

(58) Field of Classification Search
CPC .... H04B 1/801; G02B 6/4246; G02B 6/4249; G02B 6/4292; G02B 6/3807; G02B 6/4207; H04W 88/08; H04W 88/085; H04W 88/10
USPC ........ 385/76–80, 88–92, 134–13, 14; 455/14, 455/422.1, 561, 562, 562.1, 523; 398/68–99, 115–117, 42–45, 67–99
See application file for complete search history.

(56) References Cited

U.S. PATENT DOCUMENTS 4,365,865 A    12/1982 Stiles
4,420,220 A    12/1983 Dean et al.
(Continued)

FOREIGN PATENT DOCUMENTS

EP    1 534 027 A2    5/2005
EP    1 959 614 A1    8/2008
(Continued)

OTHER PUBLICATIONS

Above Ground Level (AGL) magazine; dated Jul. 2006 (vol. 3, No. 4) and Aug./Sep. 2006 (vol. 3, No. 5); pp. 1-8.
(Continued)

*Primary Examiner* — Akm Enayet Ullah
*Assistant Examiner* — Michael Mooney
(74) *Attorney, Agent, or Firm* — Merchant & Gould P.C.

(57) ABSTRACT

A cell site includes a tower, a multi-service terminal mounted to the tower and a base transceiver station in communication with the multi-service terminal. The multi-service terminal includes a housing and a plurality of adapters mounted to the housing. Each of the adapters includes an outer port accessible from outside the housing and an inner port accessible from inside the housing.

9 Claims, 18 Drawing Sheets

(51) Int. Cl.
  *G02B 6/42*    (2006.01)
  *H04W 88/08*   (2009.01)

(56) References Cited

U.S. PATENT DOCUMENTS

| | | |
|---|---|---|
| 4,497,537 A | 2/1985 | Dench |
| 4,552,432 A | 11/1985 | Anderson et al. |
| 4,695,127 A | 9/1987 | Ohlhaber et al. |
| 4,723,832 A | 2/1988 | Okazato et al. |
| 4,787,705 A | 11/1988 | Shinmoto et al. |
| 4,867,527 A | 9/1989 | Dotti et al. |
| 4,895,426 A | 1/1990 | Pinson |
| 5,268,971 A | 12/1993 | Nilsson et al. |
| 5,317,663 A | 5/1994 | Beard et al. |
| 5,394,466 A | 2/1995 | Schneider et al. |
| 5,469,523 A | 11/1995 | Blew et al. |
| 5,539,851 A | 7/1996 | Taylor et al. |
| 5,555,336 A | 9/1996 | Winslow |
| 5,555,338 A | 9/1996 | Haag et al. |
| 5,557,698 A | 9/1996 | Gareis et al. |
| 5,627,879 A | 5/1997 | Russell et al. |
| 5,648,961 A | 7/1997 | Ebihara |
| 5,651,081 A | 7/1997 | Blew et al. |
| 5,677,974 A | 10/1997 | Elms et al. |
| 5,699,176 A | 12/1997 | Cohen |
| 5,745,627 A | 4/1998 | Arroyo et al. |
| 5,778,122 A | 7/1998 | Giebel et al. |
| 5,864,672 A | 1/1999 | Bodeep et al. |
| 5,880,865 A | 3/1999 | Lu et al. |
| 5,913,003 A | 6/1999 | Arroyo et al. |
| 5,946,617 A | 8/1999 | Portaro et al. |
| 6,169,834 B1 | 1/2001 | Keller |
| 6,195,487 B1 | 2/2001 | Anderson et al. |
| 6,236,789 B1 | 5/2001 | Fitz |
| 6,343,172 B1 | 1/2002 | Schiestle et al. |
| 6,363,192 B1 | 3/2002 | Spooner |
| 6,463,198 B1 | 10/2002 | Coleman et al. |
| 6,546,175 B1 | 4/2003 | Wagman et al. |
| 6,567,592 B1 | 5/2003 | Gimblet et al. |
| 6,599,025 B1 | 7/2003 | Deutsch |
| 6,668,127 B1 | 12/2003 | Mahony |
| 6,674,966 B1 | 1/2004 | Koonen |
| 6,687,437 B1 | 2/2004 | Starnes et al. |
| 6,714,710 B2 | 3/2004 | Gimblet |
| 6,719,461 B2 | 4/2004 | Cull |
| 6,738,547 B2 | 5/2004 | Spooner |
| 6,755,575 B2 | 6/2004 | Kronlund et al. |
| 6,758,693 B2 | 7/2004 | Inagaki et al. |
| 6,785,450 B2 | 8/2004 | Wagman et al. |
| 6,847,767 B2 | 1/2005 | Hurley et al. |
| 6,895,185 B1 | 5/2005 | Chung et al. |
| 6,899,467 B2 | 5/2005 | McDonald et al. |
| 6,931,183 B2 | 8/2005 | Panak et al. |
| 6,965,718 B2 | 11/2005 | Koertel |
| 6,983,095 B2 | 1/2006 | Reagan et al. |
| 7,006,740 B1 | 2/2006 | Parris |
| 7,035,513 B2 | 4/2006 | Mohler et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| 7,120,347 B2 | 10/2006 | Blackwell, Jr. et al. |
| 7,158,703 B2 | 1/2007 | Mjelstad |
| 7,198,409 B2 | 4/2007 | Smith et al. |
| 7,233,731 B2 | 6/2007 | Solheid et al. |
| 7,264,402 B2 | 9/2007 | Theuerkorn et al. |
| 7,269,311 B2 | 9/2007 | Kim et al. |
| 7,272,281 B2 | 9/2007 | Stahulak et al. |
| 7,292,763 B2 | 11/2007 | Smith et al. |
| 7,310,430 B1 | 12/2007 | Mallya et al. |
| 7,349,605 B2 | 3/2008 | Noonan et al. |
| 7,362,936 B2 | 4/2008 | Stark et al. |
| 7,369,741 B2 | 5/2008 | Reagan et al. |
| 7,371,014 B2 | 5/2008 | Willis et al. |
| 7,397,997 B2 | 7/2008 | Ferris et al. |
| 7,400,815 B2 | 7/2008 | Mertesdorf et al. |
| 7,401,985 B2 | 7/2008 | Aronson et al. |
| 7,418,181 B2 | 8/2008 | Zimmel et al. |
| 7,445,389 B2 | 11/2008 | Aronson |
| 7,489,849 B2 | 2/2009 | Reagan et al. |
| 7,494,287 B2 | 2/2009 | Wang et al. |
| 7,499,616 B2 | 3/2009 | Aronson et al. |
| 7,512,304 B2 | 3/2009 | Gronvall et al. |
| 7,539,388 B2 | 5/2009 | Mertesdorf et al. |
| 7,565,055 B2 | 7/2009 | Lu et al. |
| 7,572,065 B2 | 8/2009 | Lu et al. |
| 7,591,595 B2 | 9/2009 | Lu et al. |
| 7,627,222 B2 | 12/2009 | Reagan et al. |
| 7,643,713 B2 | 1/2010 | Büthe et al. |
| 7,680,388 B2 | 3/2010 | Reagan et al. |
| 7,692,098 B2 | 4/2010 | Wyatt, II et al. |
| 7,712,976 B2 | 5/2010 | Aronson et al. |
| 7,715,679 B2 | 5/2010 | Kowalczyk et al. |
| 7,720,343 B2 | 5/2010 | Barth et al. |
| 7,738,789 B2 | 6/2010 | Sulzberger et al. |
| 7,740,409 B2 | 6/2010 | Bolton et al. |
| 7,744,288 B2 | 6/2010 | Lu et al. |
| 7,751,672 B2 | 7/2010 | Smith et al. |
| 7,756,379 B2 | 7/2010 | Kowalczyk et al. |
| 7,762,727 B2 | 7/2010 | Aronson |
| 7,778,510 B2 | 8/2010 | Aronson et al. |
| 7,805,044 B2 | 9/2010 | Reagan et al. |
| 7,816,602 B2 | 10/2010 | Landry et al. |
| 7,844,158 B2 | 11/2010 | Gronvall et al. |
| 7,869,681 B2 | 1/2011 | Battey et al. |
| 7,869,682 B2 | 1/2011 | Kowalczyk et al. |
| 7,873,255 B2 | 1/2011 | Reagan et al. |
| 7,876,989 B2 | 1/2011 | Aronson et al. |
| 7,897,873 B2 | 3/2011 | Gemme et al. |
| 8,041,178 B2 | 10/2011 | Lu et al. |
| 8,068,712 B2 | 11/2011 | Reagan et al. |
| 8,083,417 B2 | 12/2011 | Aronson et al. |
| 8,116,821 B2 | 2/2012 | Le Pezennec et al. |
| 8,155,525 B2 | 4/2012 | Cox |
| 8,175,433 B2 | 5/2012 | Caldwell et al. |
| 8,204,348 B2 | 6/2012 | Keller et al. |
| 8,224,145 B2 | 7/2012 | Reagan et al. |
| 8,244,087 B2 | 8/2012 | Sales Casals et al. |
| 8,249,410 B2 | 8/2012 | Andrus et al. |
| 8,254,740 B2 | 8/2012 | Smith et al. |
| 8,265,447 B2 | 9/2012 | Loeffelholz et al. |
| 8,270,838 B2 | 9/2012 | Cox |
| 8,297,854 B2 | 10/2012 | Bickham et al. |
| 8,301,003 B2 | 10/2012 | De Los Santos Campos et al. |
| 8,328,433 B2 | 12/2012 | Furuyama |
| 8,532,490 B2 | 9/2013 | Smith et al. |
| 8,665,845 B2 | 3/2014 | O'Keeffe et al. |
| 8,837,940 B2 | 9/2014 | Smith et al. |
| 2002/0136510 A1 | 9/2002 | Heinz et al. |
| 2003/0215197 A1 | 11/2003 | Simon et al. |
| 2004/0198451 A1* | 10/2004 | Varghese .................. 455/562.1 |
| 2005/0094959 A1 | 5/2005 | Sibley et al. |
| 2005/0172328 A1 | 8/2005 | Park et al. |
| 2005/0213921 A1 | 9/2005 | Mertesdorf et al. |
| 2005/0220421 A1 | 10/2005 | Keenum et al. |
| 2006/0291787 A1 | 12/2006 | Seddon |
| 2007/0065089 A1 | 3/2007 | Matsuoka et al. |
| 2007/0110026 A1 | 5/2007 | Sinha et al. |
| 2007/0269170 A1 | 11/2007 | Easton et al. |
| 2008/0025725 A1 | 1/2008 | Jette et al. |
| 2008/0037941 A1 | 2/2008 | Mallya et al. |
| 2008/0063397 A1 | 3/2008 | Hu et al. |
| 2008/0159744 A1 | 7/2008 | Soto et al. |
| 2008/0181182 A1 | 7/2008 | Carichner et al. |
| 2008/0218947 A1 | 9/2008 | Atkinson |
| 2008/0310848 A1 | 12/2008 | Yasuda et al. |
| 2009/0060531 A1 | 3/2009 | Biegert et al. |
| 2009/0162016 A1 | 6/2009 | Lu et al. |
| 2009/0245805 A1 | 10/2009 | Akasaka et al. |
| 2009/0317047 A1 | 12/2009 | Smith et al. |
| 2010/0014868 A1 | 1/2010 | McGlynn et al. |
| 2010/0021164 A1 | 1/2010 | Luk et al. |
| 2010/0200270 A1 | 8/2010 | Gemme et al. |
| 2011/0044599 A1 | 2/2011 | Kowalczyk et al. |

(56) References Cited

U.S. PATENT DOCUMENTS

| | | |
|---|---|---|
| 2011/0280527 A1 | 11/2011 | Tamura |
| 2011/0293227 A1 | 12/2011 | Wu |
| 2011/0311191 A1 | 12/2011 | Hayashishita et al. |
| 2012/0008904 A1 | 1/2012 | Han et al. |
| 2012/0008905 A1 | 1/2012 | Han et al. |
| 2012/0008906 A1 | 1/2012 | Han et al. |
| 2012/0057821 A1 | 3/2012 | Aronson et al. |
| 2012/0080225 A1 | 4/2012 | Kim et al. |
| 2012/0114288 A1 | 5/2012 | Wu |
| 2012/0191997 A1 | 7/2012 | Miller |
| 2012/0281952 A1 | 11/2012 | McColloch |
| 2012/0281953 A1 | 11/2012 | Choi et al. |
| 2012/0288245 A1 | 11/2012 | Hurley et al. |
| 2013/0011106 A1 | 1/2013 | Congdon, II et al. |
| 2013/0022318 A1 | 1/2013 | Fingler et al. |
| 2014/0199079 A1 | 7/2014 | Smith et al. |

FOREIGN PATENT DOCUMENTS

| | | | |
|---|---|---|---|
| WO | WO 2007/062606 A1 | 6/2007 | |
| WO | WO 2008/009421 A2 | 1/2008 | |
| WO | WO 2008/088762 A1 | 7/2008 | |
| WO | WO 2010/135546 A1 | 11/2010 | |

OTHER PUBLICATIONS

Broadband Properties *You Don't Know Jack?*; dated Jun. 2005; pp. 26-29.

Corning Cable Systems Evolant® *Solutions for Wireless Networks*; dated Sep. 2006; pp. 1-6.

European Patent Office, Communication, Extended European Search Report for Application No. 10749387.6 dated Nov. 12, 2014; 9 pp.

International Search Report and Written Opinion for Application No. PCT/US2010/026354 mailed Sep. 27, 2010.

Webopedia "CO"; dated Apr. 23, 2008; pp. 1-4.

Wikipedia "Fiber to the premises (FTTP)"; dated Apr. 15, 2008; pp. 1-4.

Wikipedia "Fiber to the x (FTTX)"; Dated Apr. 15, 2008; pp. 1-4.

Wikipedia "local loop"; dated Apr. 16, 2008; pp. 1-2.

Wikipedia "Local-Area Network"; dated Apr. 18, 2008; pp. 1-3.

Wikipedia "Voice over Internet Protocol (VoIP)"; dated Apr. 18, 2008; pp. 1-14.

Wikipedia "Wireless local loop (WLL)"; dated Apr. 16, 2008; pp. 1-6.

Wikipedia *Network Operations Center*; dated Apr. 23, 2008; pp. 1-2.

\* cited by examiner

FIBER TO THE ANTENNA

CROSS-REFERENCE TO RELATED APPLICATION

The present application claims the benefit of U.S. Provisional Patent Application Ser. No. 61/324,245, filed Apr. 14, 2010, which application is hereby incorporated by reference in its entirety.

SUMMARY

An aspect of the present disclosure relates to a cell site of a telecommunications network. The cell site includes a tower, a multi-service terminal mounted to the tower and a base transceiver station in communication with the multi-service terminal. The multi-service terminal includes a housing and a plurality of adapters mounted to the housing. Each of the adapters includes an outer port accessible from outside the housing and an inner port accessible from inside the housing.

Another aspect of the present disclosure relates to a telecommunications network. The telecommunications network includes a cell site and a backhaul in communication with the cell site. The cell site includes a tower, a multi-service terminal mounted to the tower and a base transceiver station in communication with the multi-service terminal. The multi-service terminal includes a housing and a plurality of adapters mounted to the housing. Each of the adapters includes an outer port accessible from outside the housing and an inner port accessible from inside the housing. A plurality of remote transceivers is in communication with the outer ports of the adapters of the multi-service terminal.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
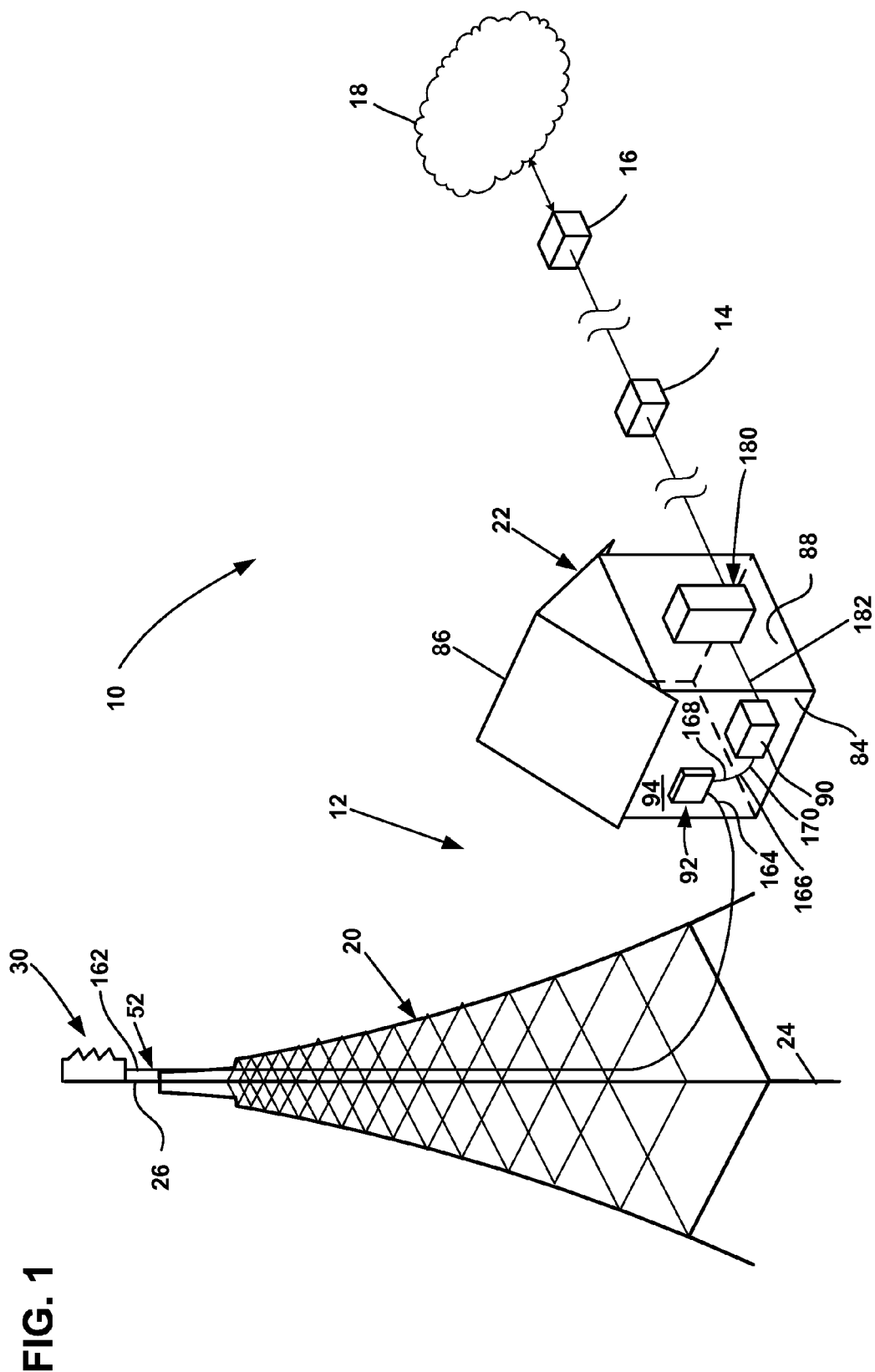
FIG. 1 is a schematic representation of a telecommunications network having exemplary features of aspects in accordance with the principles of the present disclosure.

Referring now to FIG. 1, a schematic representation of a telecommunications network 10 is shown. In the depicted embodiment, the telecommunications network 10 is a cellular network 10. The cellular network 10 includes a cell site 12, a demarcation point 14, a backhaul 16 and a core network 18.

The cell site 12 creates an area of telecommunications coverage (i.e., a cell) in the cellular network 10. In one embodiment, the cell site 12 includes a tower or mast 20 and a hut 22 that is in communication with the tower 20. In another embodiment, the cell site 12 includes a hut 22 that is in communication with an antenna or a plurality of antenna.

Figure 2:
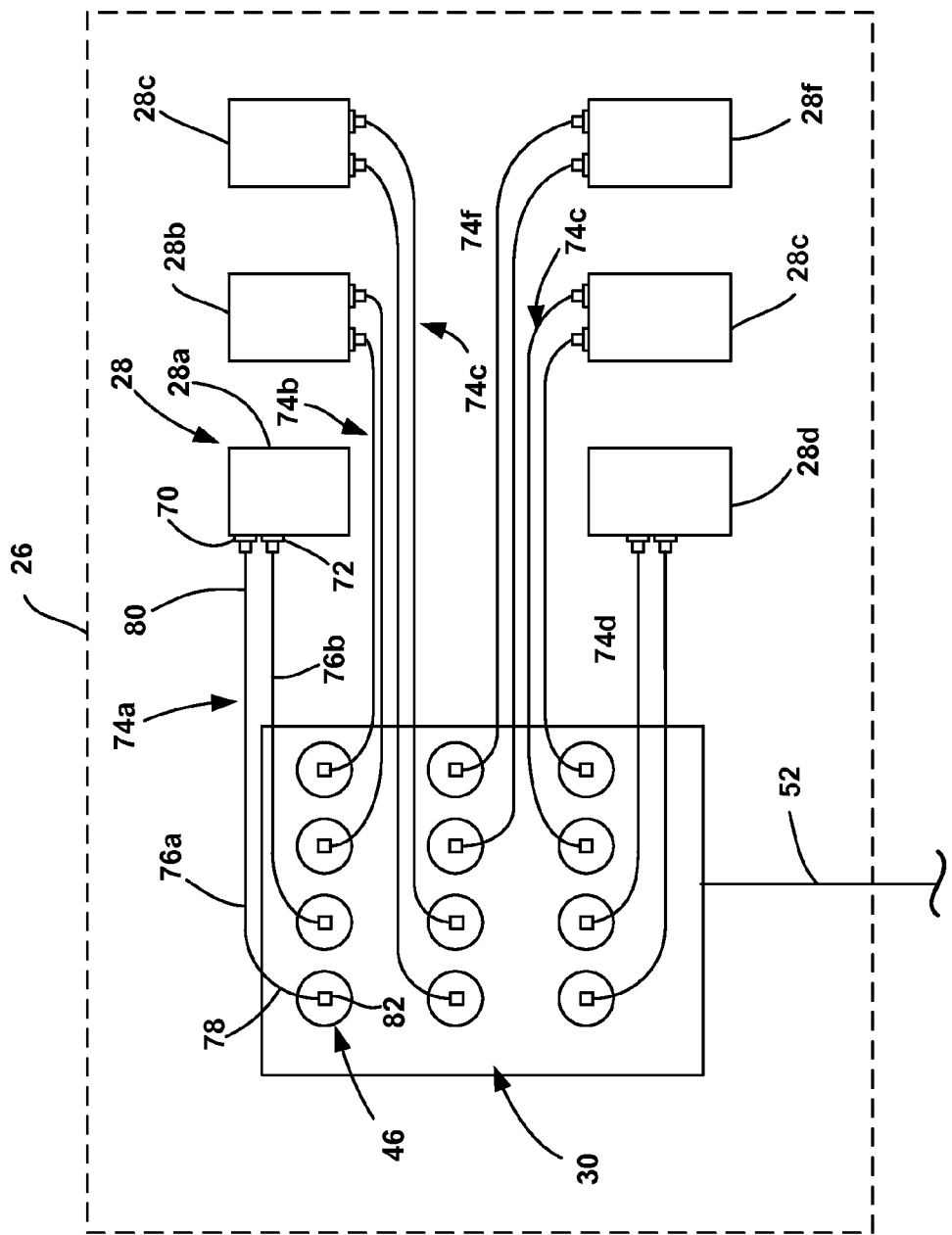
FIG. 2 is a schematic representation of a top portion of a tower of the telecommunications network of FIG. 1.
Figure 3:
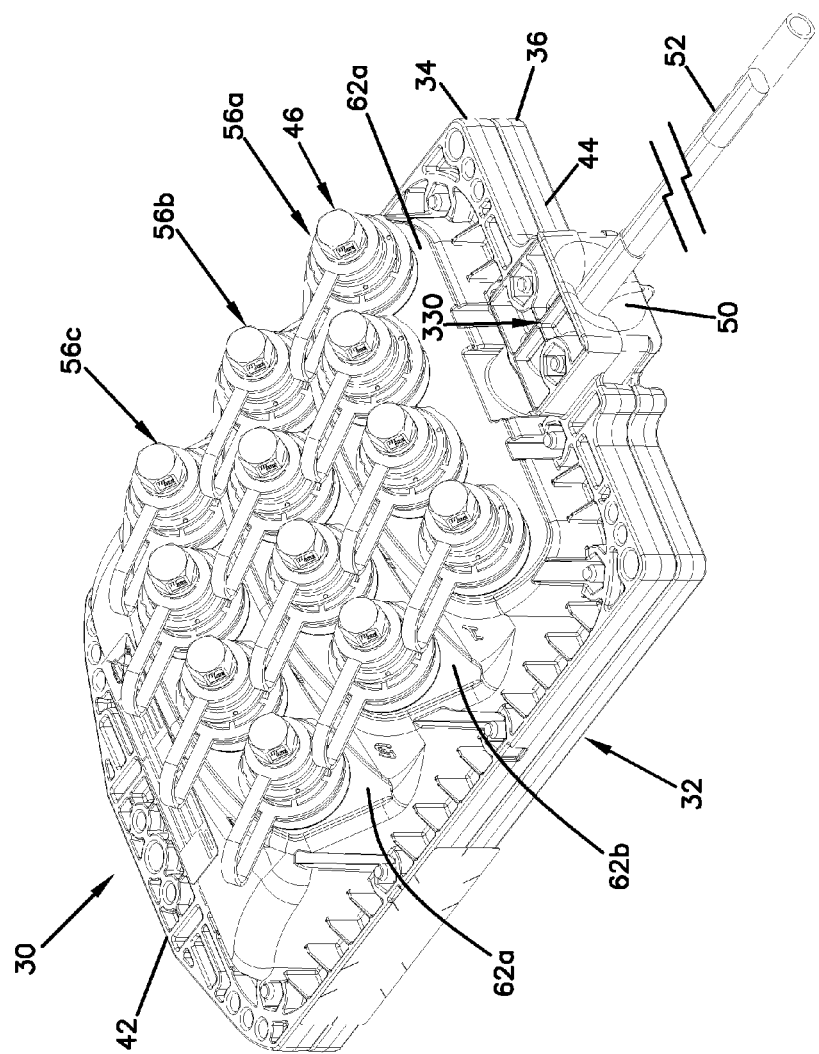
FIG. 3 is a perspective view of a multi-service terminal suitable for use with the telecommunications network of FIG. 1.
Figure 4:
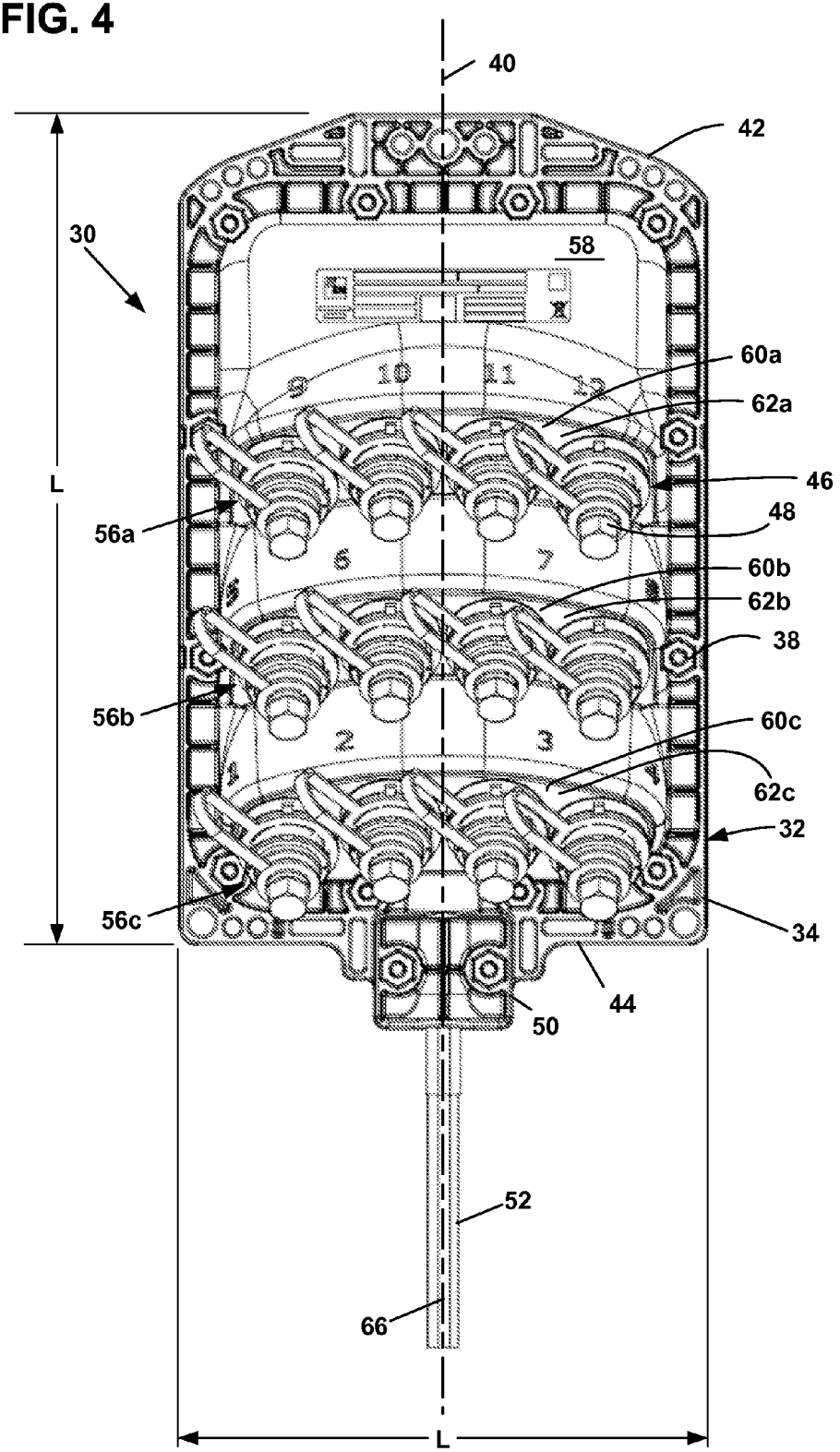
FIG. 4 is a front view of the multi-service terminal of FIG. 3.

Referring now to FIGS. 1 and 2, the tower 20 includes a base portion 24 and an oppositely disposed top portion 26. In the depicted embodiment, the base portion 24 is rigidly fixed at a mounting location.

The top portion 26 includes a remote transceiver 28 (e.g., a remote radio head). The remote transceiver 28 is adapted to transmit and receive signals to and from devices (e.g., mobile phones, smart-phones, devices with wireless internet connectivity, etc.) of subscribers to the cellular network 10. In the depicted embodiment, the top portion 26 of the tower 20 includes a first remote transceiver 28a, a second remote transceiver 28b, a third remote transceiver 28c, a fourth remote transceiver 28d, a fifth remote transceiver 28e and a sixth remote transceiver 28f. In the subject embodiment, the fourth, fifth and sixth remote transceivers 28d-28f are backup remote transceivers.

In one embodiment, the top portion 26 of the tower 20 may include an antenna. The remote transceiver 28 may be integrated into the antenna. In another embodiment, Referring now to FIGS. 1-5, the top portion 26 of the tower 20 further includes a multi-service terminal 30. Terminal that are suitable for use as the multi-service terminal 30 of the present disclosure have been described in U.S. Pat. Nos. 7,292,763 and 7,512,304, the disclosures of which are hereby incorporated by reference in their entirety.

The multi-service terminal 30 includes a housing 32. The housing 32 includes a first piece 34 and a second piece 36. In the depicted embodiment, the first piece 34 is a front piece while the second piece 36 is a back piece. The first and second pieces 34, 36 of the housing 32 cooperatively define an enclosed interior of the housing 32. The first and second pieces 34, 36 are joined by fasteners 38 (e.g., bolts or other fastening elements) spaced about a periphery of the main housing 32.

The first and second pieces 34, 36 are elongated along a central longitudinal axis 40 so as to extend generally from a first end 42 to an oppositely disposed second end 44 of the housing 32. The multi-service terminal 30 also includes fiber optic adapters 46 mounted to the first piece 34 of the housing 32. Each of the fiber optic adapters 46 includes an outer port 48 accessible from outside the housing 32 and an inner port accessible from the interior of the housing 32. In the depicted embodiment, the second end 44 of the housing 32 defines a cable port 50 for allowing a fiber optic cable 52 to enter/exit the interior of the housing 32.

The housing 32 of the multi-service terminal 30 includes a length L and a width W. The length L is parallel to the central longitudinal axis 40 of the housing 32. First, second and third rows 54a, 54b, 54c of fiber optic adapters 46 are mounted to the first piece 34 of the housing 32. In the depicted embodiment, each of the first, second and third rows 54a, 54b, 54c includes four fiber optic adapters 46 spaced-apart across the width W of the housing 32. The first row 54a is located closest the first end 42 of the housing 32, the third row 56c is located closest the second end 44 of the housing 32 and the second row 56b is located between the first and third rows 56a, 56c. An exterior surface 58 of the first piece 34 has a stepped configuration with a first, second and third step 60a, 60b, 60c positioned consecutively along the length L of the housing 32. Each of the first, second and third steps 60a, 60b, 60c includes an adapter mounting wall 62a-c. The adapter mounting wall 62a-c of each of the first, second and third steps 60a, 60b, 60c defines adapter mounting openings in which the fiber optic adapters 46 are mounted.

Figure 5:
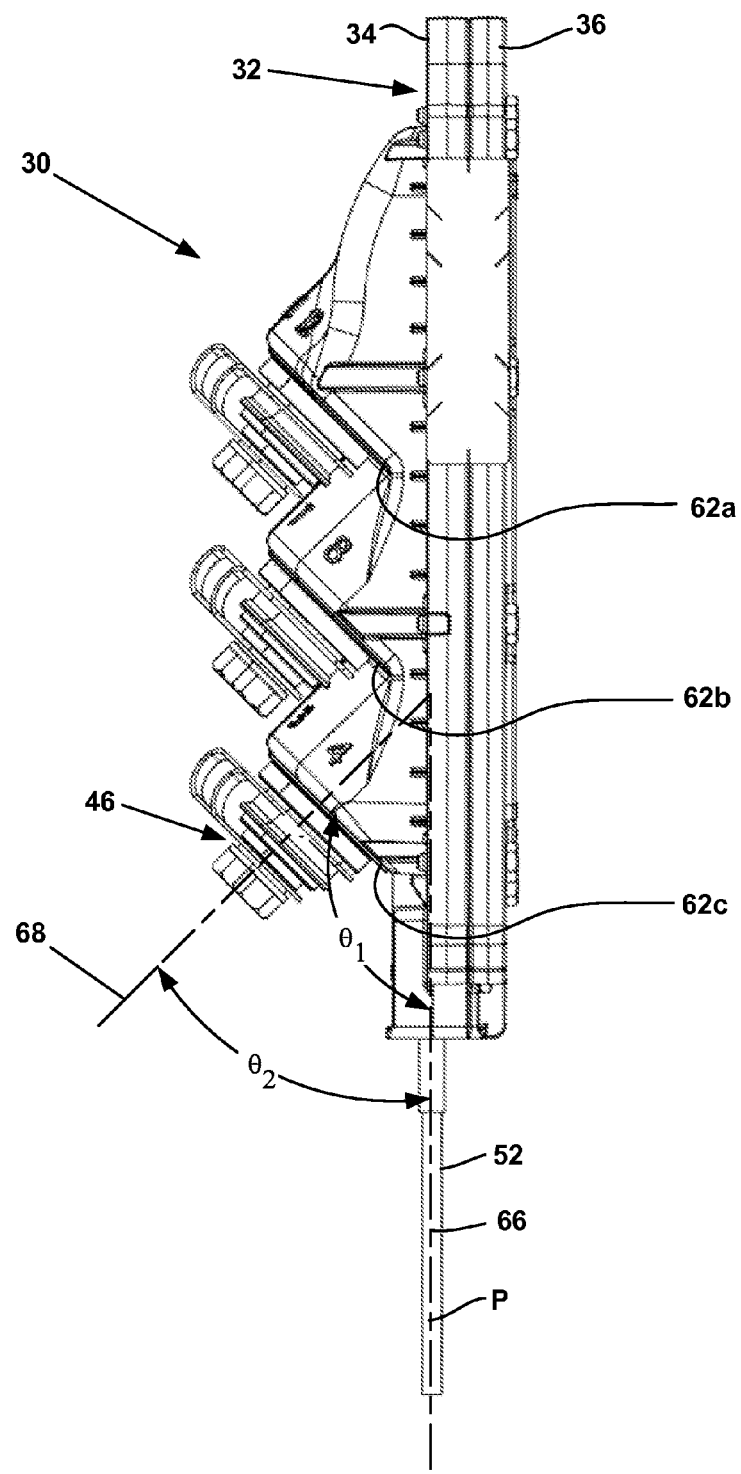
FIG. 5 is a side view of the multi-service terminal of FIG. 3.

As shown at FIG. 5, the adapter mounting walls 62a-62c are generally parallel to one another and are spaced apart along the length L of the housing 32. The adapter mounting walls 62a-62c have front faces that are aligned at an oblique angle $\theta_1$ relative to a plane P that extends through a center axis 66 of the fiber optic cable 52 and across the width W of the housing 32. The angled configuration of the adapter mounting walls 62 causes the fiber optic adapters 46 to be angled relative to the plane P. For example, center axes 68 of the fiber optic adapters 46 are shown aligned at an oblique angle $\theta_2$ relative to the plane P. In this way, the outer ports 48 of the fiber optic adapters 46 face generally in the same direction that the fiber optic cable 52 enters/exits the multi-service terminal 30.

Referring now to FIG. 2, each of the remote transceivers 28a-28f includes an input port 70 and an output port 72. The input port 70 is a connection location through which signals from the core network 18 are received by the remote transceiver 28 and then transmitted from the remote transceiver 28 to a subscriber. The output port 72 is a connection location through which signals from the subscriber are sent to the core network 18.

In the depicted embodiment of FIG. 2, each input port 70 and each output port 72 of the remote transceivers 28 is optically connected to the multi-service terminal 30. The remote transceivers 28 are in communication with the multi-service terminal 30 through a plurality of fiber optic drop cables 74. A first plurality of fiber optic drop cables 74a provides communication between the first remote transceiver 28a and the multi-service terminal 30. A second plurality of fiber optic drop cables 74b provides communication between the second remote transceiver 28b and the multi-service terminal 30. A third plurality of fiber optic drop cables 74c provides communication between the third remote transceiver 28c and the multi-service terminal 30. A fourth plurality of fiber optic drop cables 74d provides communication between the fourth remote transceiver 28d and the multi-service terminal 30. A fifth plurality of fiber optic drop cables 74e provides communication between the fifth remote transceiver 28e and the multi-service terminal 30. A sixth plurality of fiber optic drop cables 74f provides communication between the sixth remote transceiver 28f and the multi-service terminal 30.

Each of the first, second, third, fourth, fifth and sixth pluralities of fiber optic drop cables 74a-74f includes a first drop cable 76a and a second drop cable 76b. Each of the first and second drop cables 76a, 76b includes a first end 78 and an oppositely disposed second end 80. The first and second ends 78, 80 include fiber optic connectors 82. In one embodiment, the fiber optic connectors 82 are simplex-fiber connectors (e.g., SC, LC, etc.). In another embodiment, the fiber optic connectors 82 are multi-fiber connectors.

The fiber optic connector 82 on the first end 78 of the first drop cable 76a of the first plurality of fiber optic drop cables 74a is engaged to one of the fiber optic adapters 46 of the multi-service terminal 30 while the second end 80 of the first drop cable 76a is engaged to the input port 70 of the first remote transceiver 28a. The fiber optic connector 82 on the first end 78 of the second drop cable 76b of the first plurality of fiber optic drop cables 74a is engaged to another of the fiber optic adapters 46 of the multi-service terminal 30 while the second end 80 of the second drop cable 76b is engaged to the output port 72 of the first remote transceiver 28a. Each of the fiber optic connectors 82 on the first ends 78 of the first and second drop cables 76a, 76b of the first, second, third, forth, fifth and sixth plurality of fiber optic drop cables 28a-28f is engaged with a different fiber optic adapter 46 of the multi-service terminal 30.

Referring now to FIG. 1, the hut 22 will be described. In the depicted embodiment, the hut 22 is disposed near the base portion 24 of the tower 20. The hut 22 is a structure that includes a plurality of walls 84 and a roof 86. The walls 84 and the roof 86 of the hut 22 cooperatively define an interior 88 of the hut 22.

In the depicted embodiment, a base transceiver station (BTS) 90 is disposed in the interior 88 of the hut 22. The base transceiver station 90 facilitates wireless communication between the devices of subscribers to the cellular network 10 and the core network 18.

The base transceiver station 90 can include a plurality of transceivers for receiving and transmitting signals and a power amplifier for amplifying the signals. The base transceiver station 90 can be configured for any one or more telecommunications standards including 3G (e.g., GSM, EDGE, UMTS, CDMA, DECT, WiMAX, etc.), LTE, and 4G. In one embodiment, the base transceiver station 90 includes an optical multiplexer to join signals to be transmitted together and a demultiplexer to separate received signals.

The base transceiver station 90 is connected to the remote transceivers 28 on the top portion 26 of the tower 20 through an enclosure 92. In the depicted embodiment, the enclosure 92 is disposed on an exterior surface 94 of the hut 22.

Figure 6:
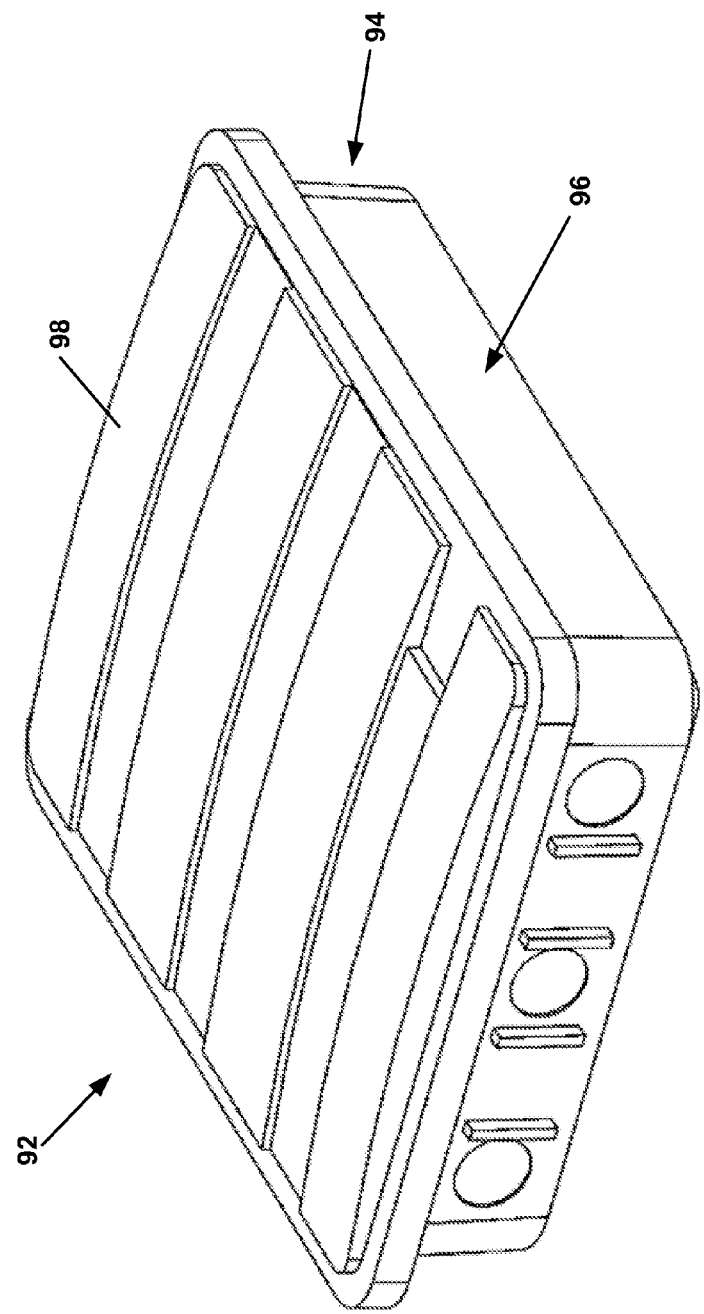
FIG. 6 is a perspective view of an enclosure that is suitable for use with the telecommunications network of FIG. 1.
Figure 7:
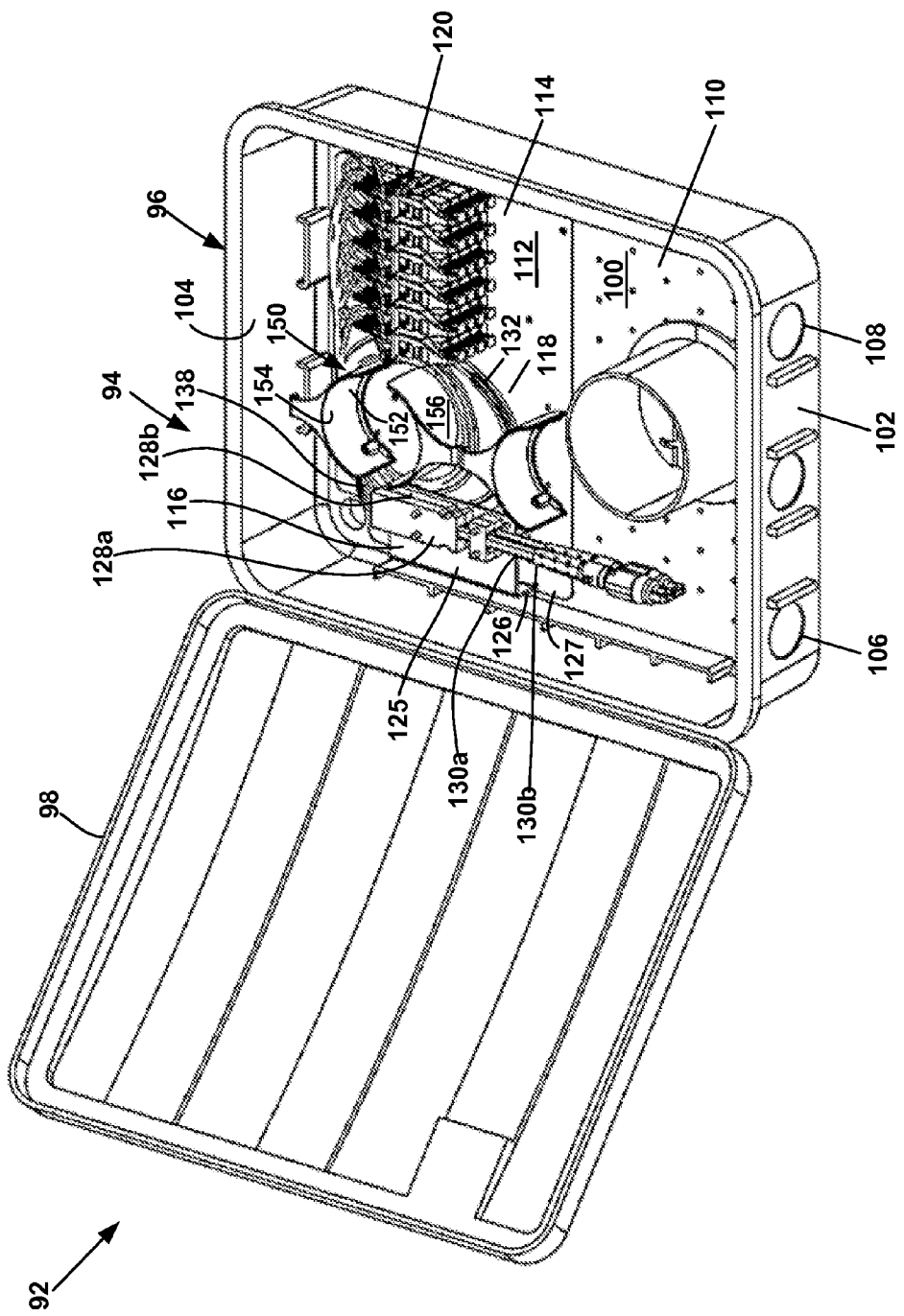
FIG. 7 is a perspective view of the enclosure of FIG. 6 with a cover in an open position.
Figure 8:
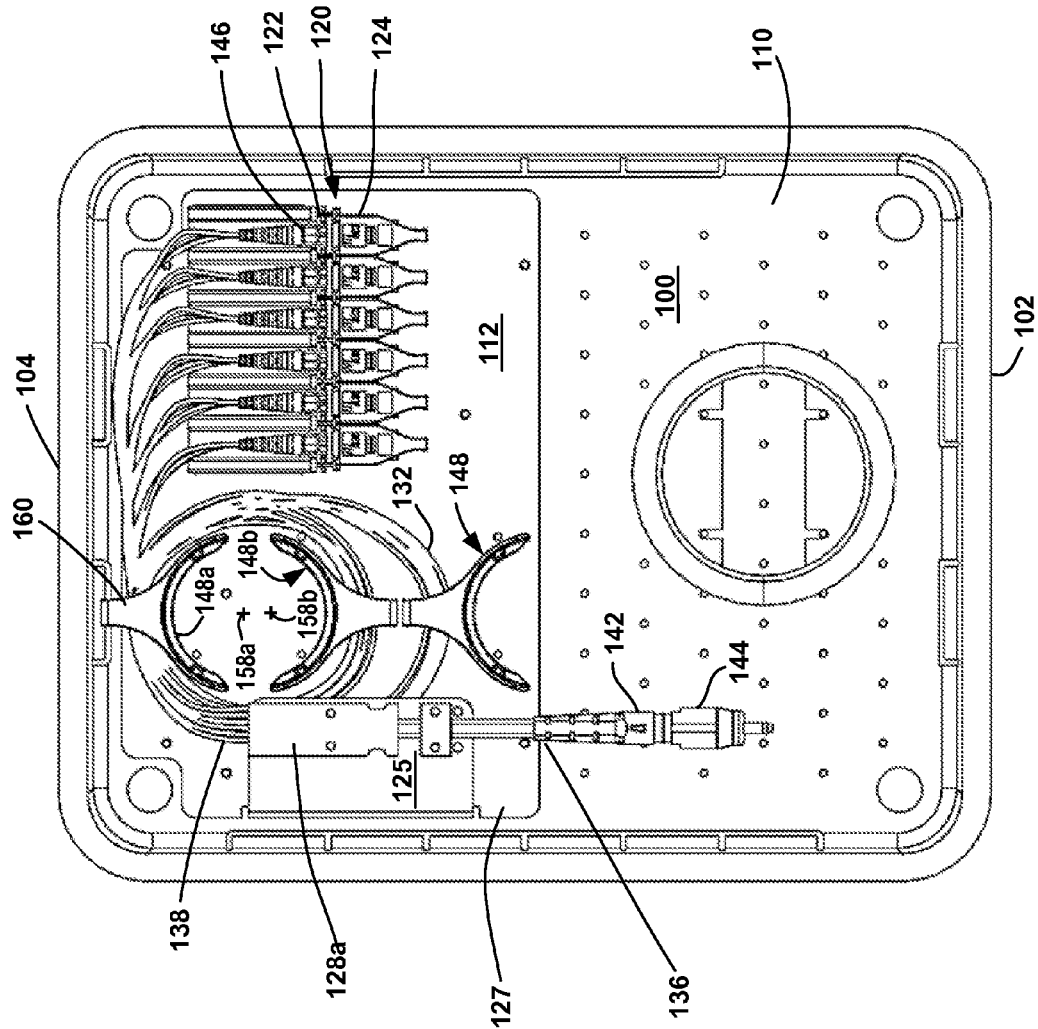
FIG. 8 is a front view of the enclosure with the cover removed.
Figure 9:
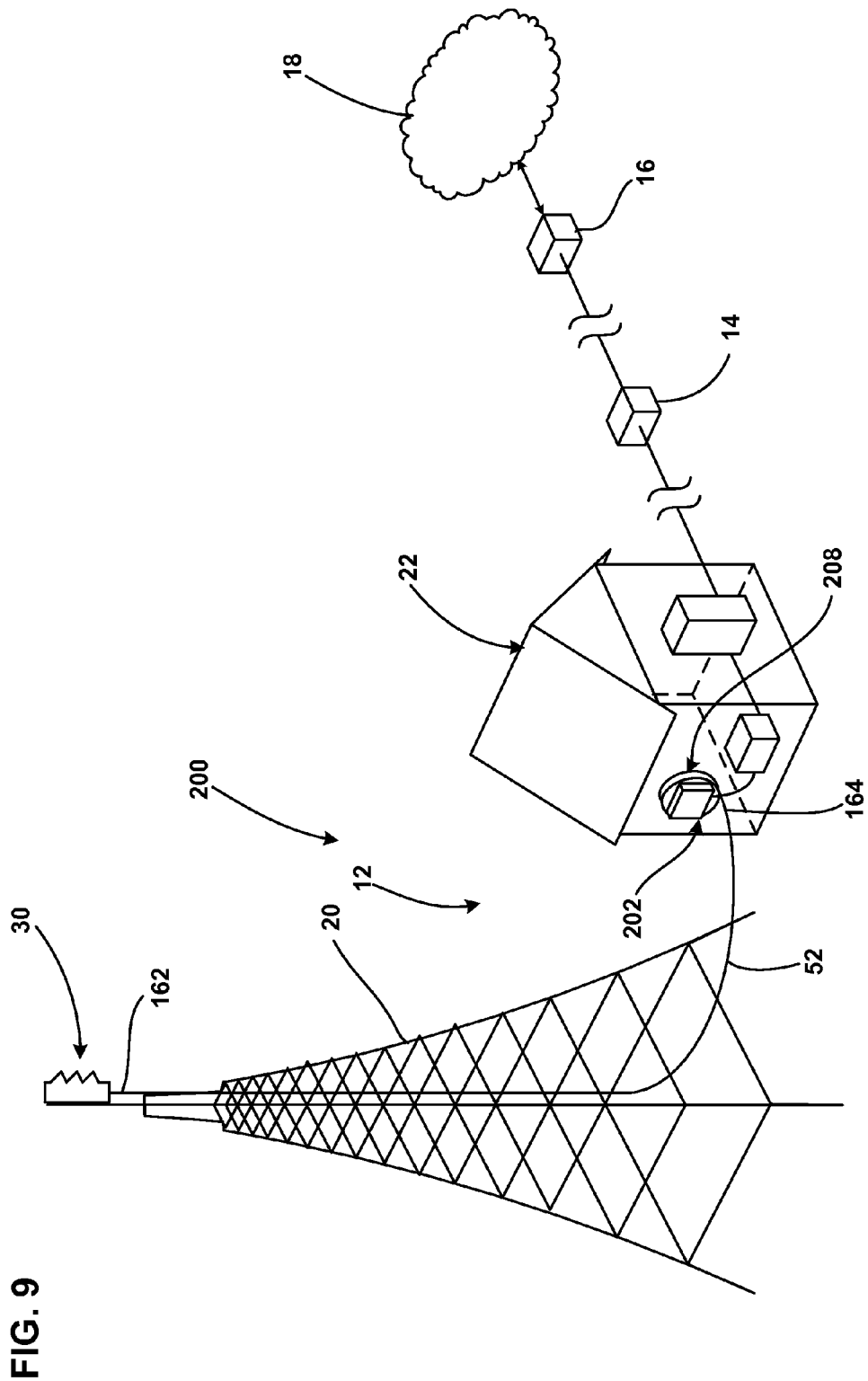
FIG. 9 is an alternate embodiment of a telecommunications network having exemplary features of aspects in accordance with the principles of the present disclosure.

Referring now to FIGS. 6-8, the enclosure 92 is shown. The enclosure 92 includes a housing 94 having a base 96 and a cover 98. The cover 98 is removably engaged to the base 96.

The base 96 includes a base wall 100, a first end 102 extending outwardly from the base wall 100 and an oppositely disposed second end 104 extending outwardly from the base wall 100. The first end 102 defines a first cable passage 106 and a second cable passage 108. Each of the first and second cable passages 106, 108 provide a pathway into an interior region 110 of the enclosure 92. The interior region 110 is cooperatively defined by the base 96 and the cover 98.

The enclosure 92 further includes a base panel 112 disposed in the interior region 110. The base panel 112 is mounted to the base wall 100 of the enclosure 92. In one embodiment, the base panel 112 occupies less than or equal to about 75% of the base wall 100. In another embodiment, the base panel 112 occupies less than or equal to about 50% of the base wall 100. In the depicted embodiment, the base panel 112 is disposed adjacent to the second end 104 of the enclosure 92. In the depicted embodiment, the base panel 112 is disposed closer to the second end 104 of the enclosure 92 than the first end 102.

The base panel 112 includes a termination region 114, a fanout region 116 and a storage region 118. The termination region 114 includes a plurality of fiber optic adapters 120. In the depicted embodiment, the enclosure 92 includes twenty-four fiber optic adapters 120. Each of the fiber optic adapters 120 includes a first side 122 and an oppositely disposed second side 124. In the depicted embodiment, the plurality of fiber optic adapters 120 is disposed adjacent to the second end 104 of the enclosure 92.

The fanout region 116 includes a platform 125. The platform 125 is offset from the base panel 112 so that the platform 125 is generally parallel to the base panel 112. In the depicted orientation of FIG. 7, the platform 125 is elevated above the base panel 112. A support 126 is engaged to the base panel 112 and the platform 125. The support 126 extends outwardly from the base panel 112 in a generally perpendicular direction. In the depicted embodiment, the support 126 is disposed at a periphery 127 of the base panel 112.

The fanout region 116 further includes a first fanout 128a and a first fiber optic cable stub 130a engaged to the first fanout 128a. In the depicted embodiment, the fanout region 116 includes a second fanout 128b and a second fiber optic cable stub 130b engaged to the second fanout 128b.

Each of the first and second fiber optic cable stubs 130a, 130b includes a plurality of optical fibers 132. The first and second fanouts 128a, 128b are adapted to fan-out or spread apart the optical fibers 132 of the first and second fiber optic cable stubs 130a, 130b. In the depicted embodiment, the first and second fanouts 128a, 128b are disposed in a stacked arrangement in the fanout region 116. In the depicted embodiment, the first and second fanouts 128a, 128b are mounted to platform 125 of the base panel 112 of the enclosure 92 by a plurality of fasteners 134 (e.g., screws, nuts, bolts, adhesive, resilient latches, etc.).

Each of the first and second fiber optic cable stubs 130a, 130b includes a first end portion 136 and a second end portion 138. The first end portion 136 of each of the first and second fiber optic cable stubs 130a, 130b includes an outer jacket that surrounds the optical fibers. The first end portion 136 is generally stiff. In one embodiment, the first end portion 136 has a generally flat cross-section and includes two strength members. The first end portions 136 of the first and second fiber optic cable stubs 130a, 130b is generally aligned with the first cable passage 106.

Each of the first end portions 136 of the first and second fiber optic cable stubs 130a, 130b includes a multi-fiber connector 142 engaged to the optical fibers 132. The multi-fiber connectors 142 are ruggedized connectors. In one embodiment, the multi-fiber connectors 142 are OptiTip MT connectors manufactured by Corning Cable Systems LLC. The multi-fiber connectors 142 are disposed in the interior region 110 of the enclosure 92. In the depicted embodiment, the multi-fiber connectors 142 include dust caps 144 that are adapted for removal.

Each of the second end portions 138 of the first and second fiber optic cable stubs 130a, 130b extends outwardly from the first and second fanouts 128a, 128b, respectively. The second end portions 138 of the first and second fiber optic cable stubs 130a, 130b include a plurality of fiber optic connectors 146 disposed on the ends of the plurality of optical fibers 132. The fiber optic connectors 146 of the second end portions 138 are connected to the first side 122 of the fiber optic adapters 120.

In the depicted embodiment, the storage region 118 is disposed between the termination region 114 and the fanout region 116. The storage region 118 includes a plurality of bend radius protectors 148. In the subject embodiment, the storage region 118 includes a first bend radius protector 148a and a second bend radius protector 148b.

Each of the bend radius protectors 148 includes a body 150. The body 150 includes a first end 152 and an oppositely disposed second end 154. The first end 152 is mounted to the base panel 112. The second end 154 extends outwardly from the base panel 112. In the depicted embodiment, the body 150 includes an arcuate portion 156 that extends between the first and second ends 152, 154. The arcuate portion 156 has a radius that is greater than the minimum bend radius of the optical fibers 132 of the first and second cable stubs 130a, 130b. In one embodiment, the arcuate portion 156 of the bend radius protector 148 extends an angle α (shown in FIG. 8) that is less than or equal to about 180°. In another embodiment, the angle α is greater than or equal to about 90°. In another embodiment, the angle α is in a range of about 90° to about 180°.

The arcuate portion 156 of the first bend radius protector 148a defines a center 158a while the arcuate portion 156 of the second bend radius protector 148b defines a center 158b. In the depicted embodiment, the first and second bend radius protectors 148a, 148b are disposed on the base panel 112 so that the centers 158a, 158b are offset. This offset provides an outer shape of the first and second bend radius protectors 148a, 148b that is generally oval.

Each of the bend radius protectors 148 includes a retention projection 160. The retention projection 160 extends outwardly from the second end 154 of the body 150 in a generally radial direction.

In the subject embodiment, the optical fibers 132 are routed from the first and second fanouts 128a, 128b to the storage region 118. In one embodiment, the optical fibers 132 are routed around the first and second bend radius protectors 148a, 148b and routed to the termination region 114. In the depicted embodiment, a portion of the optical fibers 132 in the storage region 118 are disposed beneath the platform 125 of the fanout region 116. At the termination region 114, the fiber optic connectors 146 are engaged to the first side 122 of the fiber optic adapters 120.

Referring now to FIGS. 1 and 7, the fiber optic cable 52 from the multi-service terminal 30 is routed to the enclosure 92 on the hut 22. The fiber optic cable 52 includes a first end 162 and an oppositely disposed second end 164. The first end 162 includes a plurality of connectors that are engaged to the inner ports of the fiber optic adapters 46 of the multi-service terminal 30. The second end 164 includes a multi-fiber connector that is adapted for engagement to one of the first and second multi-fiber connectors 142 of the enclosure 92.

A jumper cable 166 provides communication between the enclosure 92 and the base transceiver station 90. The jumper cable 166 includes a first end 168 and an oppositely disposed second end 170. The first end 168 is connected to the enclosure 92 while the second end 170 is connected to the base transceiver station 90. In one embodiment, the first end 168 includes a plurality of connectors that are engaged with the second side 124 of the fiber optic adapters 120 of the enclosure 92.

In one embodiment, the second end 170 of the jumper cable 166 includes a multi-fiber connector that is engaged to the base transceiver station 90. In another embodiment, the second end 170 includes a plurality of connectors that is engaged to the base transceiver station 90.

Referring now to FIG. 1, the base transceiver station 90 is in communication with a telecommunications equipment rack 180 through a multi-fiber patch cable 182. The telecommunications equipment rack 180 is disposed in the hut 22. In one embodiment, the telecommunications equipment rack 180 includes any one or more of a power distribution unit, a fiber distribution unit, a transport switch, a mobile router, a media converter, an Ethernet panel, a DSX panel, protection and a battery.

The telecommunications equipment rack 180 is in communication with the demarcation point 14. The demarcation point 14 is in communication with the backhaul 16, which is in communication with the core network 18.

Referring now to FIGS. 9-12, an alternate embodiment of a telecommunications network 200 is shown. In the depicted embodiment, the telecommunications network 200 includes the cell site 12, the demarcation point 14, the backhaul 16 and the core network 18.

The cell site 12 includes the tower 20 and the hut 22. An enclosure 202 is disposed on an exterior wall 204 of the hut 22. The enclosure 202 includes a housing 206, a cable spool 208 disposed on an external surface of the housing 206 and a mounting plate 210. An enclosure suitable for use with the telecommunications network 200 has been described in U.S. Patent Application Publication No. 2008/0292261, which is hereby incorporated by reference in its entirety.

Figure 10:
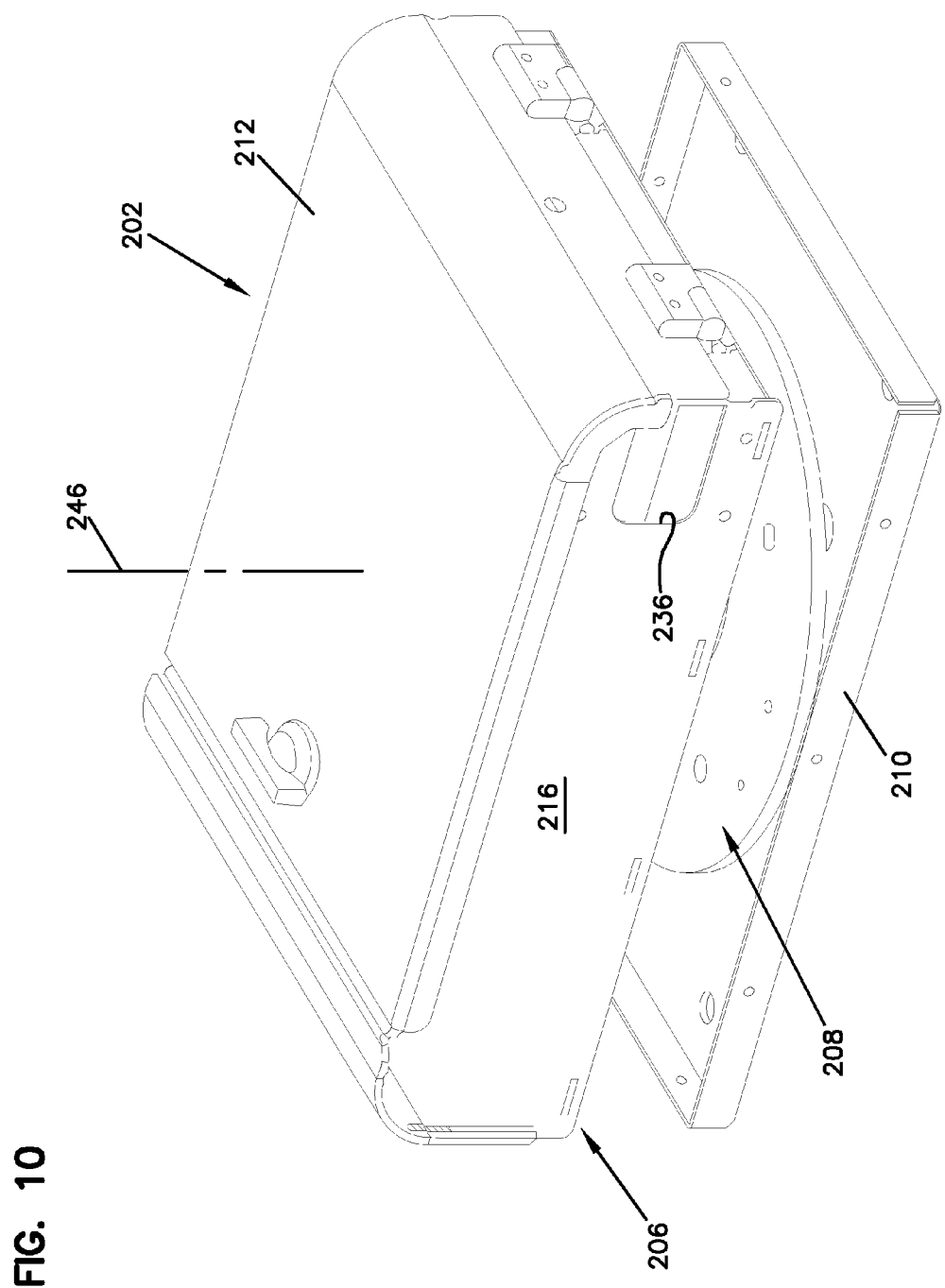
FIG. 10 is a perspective view of an enclosure suitable for use with the telecommunications network of FIG. 9.
Figure 11:
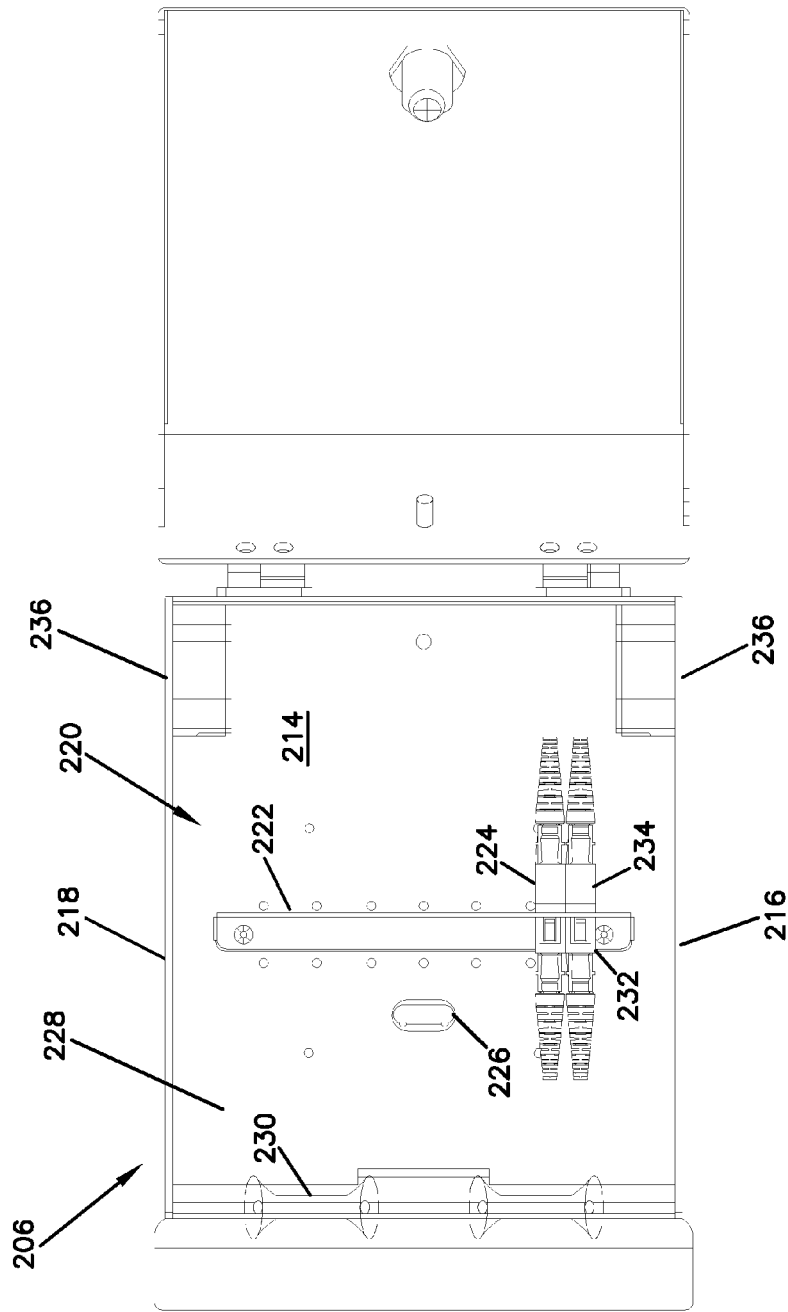
FIG. 11 is a front view of the enclosure of FIG. 10 with a cover in an open position.
Figure 12:
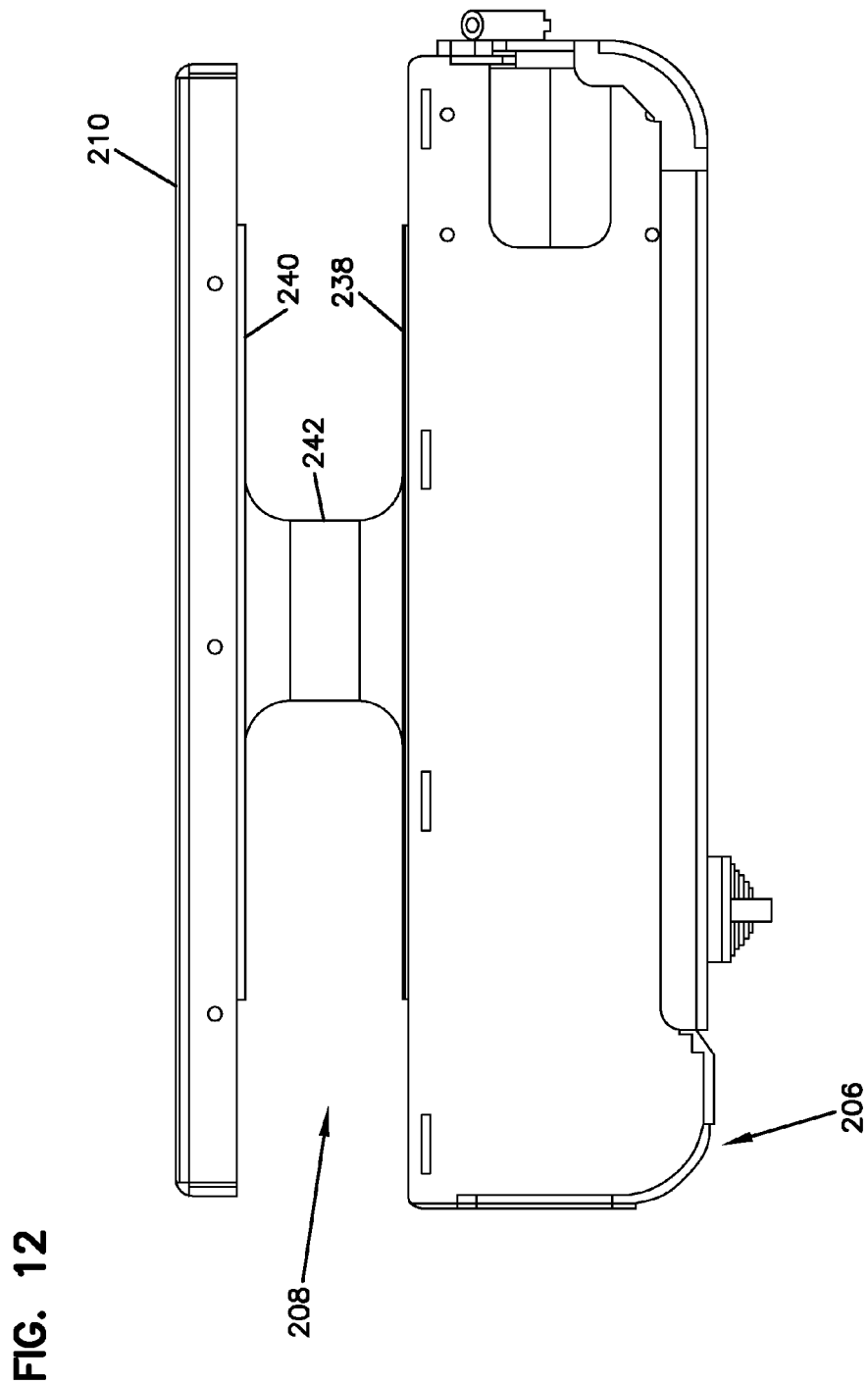
FIG. 12 is a top view of the enclosure of FIG. 10.

Referring now to FIGS. 10-12, the housing 206 includes a cover 212, a base 214, a first sidewall 216, and an oppositely disposed second sidewall 218. The first and second sidewalls 216, 218 extend outwardly from the base 214 such that the base 214 and the first and second sidewalls 216, 218 cooperatively define an interior region 220.

A termination module, generally designated 222, is disposed in the interior region 220 of the housing 206. The termination module 222 of the enclosure 202 serves as the dividing line between the incoming fibers and the outgoing fibers. In the subject embodiment, the termination module 222 is mounted to the base 214 of the housing 206. In the subject embodiment, the termination module 222 includes a plurality of adapters 224.

The base 214 of the housing 206 defines a cable passage 226 through which incoming optical fibers pass. The interior region 220 of the housing 206 includes a slack storage area 228 in which is disposed a plurality of bend radius protectors 230. Each of the bend radius protectors 230 is sized such that an outer radius of the bend radius protector 230 is larger than the minimum bend radius of the optical fiber so as to avoid attenuation damage to the optical fibers during storage. In the subject embodiment, the cable passage 226 is disposed between the slack storage area 228 and the termination module 222. As incoming optical fibers pass through the cable passage 226, the incoming optical fibers are routed to the slack storage area 228. Connectorized ends of the incoming optical fibers are then routed from the slack storage area 228 to front sides 232 of the adapters 224. Connectorized ends of outgoing optical fibers are routed from the back sides 234 of the adapters 224 through fiber exit ports 236 which are disposed in the first and second sidewalls 216, 218 and to the base transceiver station 90.

The cable spool 208 is disposed on an exterior of the housing 206. In the subject embodiment, the cable spool 208 is disposed on the back side of the base 214. The cable spool 208 includes a first axial end 238, an oppositely disposed second axial end 240, and a spooling portion 242 disposed between the first and second axial ends 238, 240. The first axial end 238 is rigidly engaged (i.e., non-rotatable) to the back side of the base 214.

In one embodiment, the first axial end 238 of the cable spool 208 includes a passage. During engagement of the first axial end 238 and the back side of the base 214 of the housing 206, the first axial end 238 of the cable spool 208 is mounted to the base 214 such that the passage is aligned with the cable passage 226. With the passage of the cable spool 208 and the cable passage 226 of the base 214 aligned, incoming optical fibers, which are coiled around the spooling portion 242 of the cable spool 208, can enter the housing 206.

Referring now to FIGS. 9-12, the fiber optic cable 52, which includes multiple optical fibers, is coiled around the spooling portion 242 of the cable spool 208. The first end 162 of the fiber optic cable 52 includes connectors that are engaged to the inner ports of the fiber optic adapters 46 of the multi-service terminal 30. The second end 164 includes connectorized ends, which are inserted through the passage and the cable passage 226 and connectedly engaged with the front sides 232 of the adapters 224. However, the length of fiber optic cable 52 needed between the enclosure 202 and the multi-service terminal 30 will vary depending upon the location of the enclosure 202 with respect to the multi-service terminal 30.

A method of selectively paying-out the fiber optic cable 52 will now be described. As previously mentioned, the second end 164 of the fiber optic cable 52 is in connected engagement with the termination module 222, which is disposed in the interior region 220 of the housing 206. With the second end 164 of the fiber optic cable 52 in connected engagement with the front sides 232 of the adapters 224 and the outgoing optical fibers disengaged from the back sides of the adapters 224, the fiber optic cable 52 can be paid out. The first axial end 238 of the cable spool 208 is rigidly engaged to the housing 206 while the second axial end 240 of the cable spool 208 is engaged with the mounting plate 210 so that the cable spool 208 and housing 206 can selectively rotate about an axis 246 of the mounting plate 210. Therefore, with the mounting plate 210 mounted to the exterior wall 204 of the hut 22, the desired length of the fiber optic cable 52 can be paid out from the enclosure 202 by rotating the enclosure 202 in a rotational direction about the axis 246 of the mounting plate 210. Since the housing 206 and the cable spool 208 rotate unitarily about the axis 246 of the mounting plate 210, the first end 162 of the fiber optic cable 52 can be paid out without the second end 164 of the fiber optic cable 52 being pulled out of the termination module 222.

Once the desired length of fiber optic cable 52 has been paid out, the rotation of the enclosure 202 is ceased. In one embodiment, any excess fiber optic cable 52 is stored on the spooling portion 242 of the cable spool 208. At this point, the position of the enclosure 202 can be fixed so that it does not rotate relative to the mounting plate 210.

Figure 13:
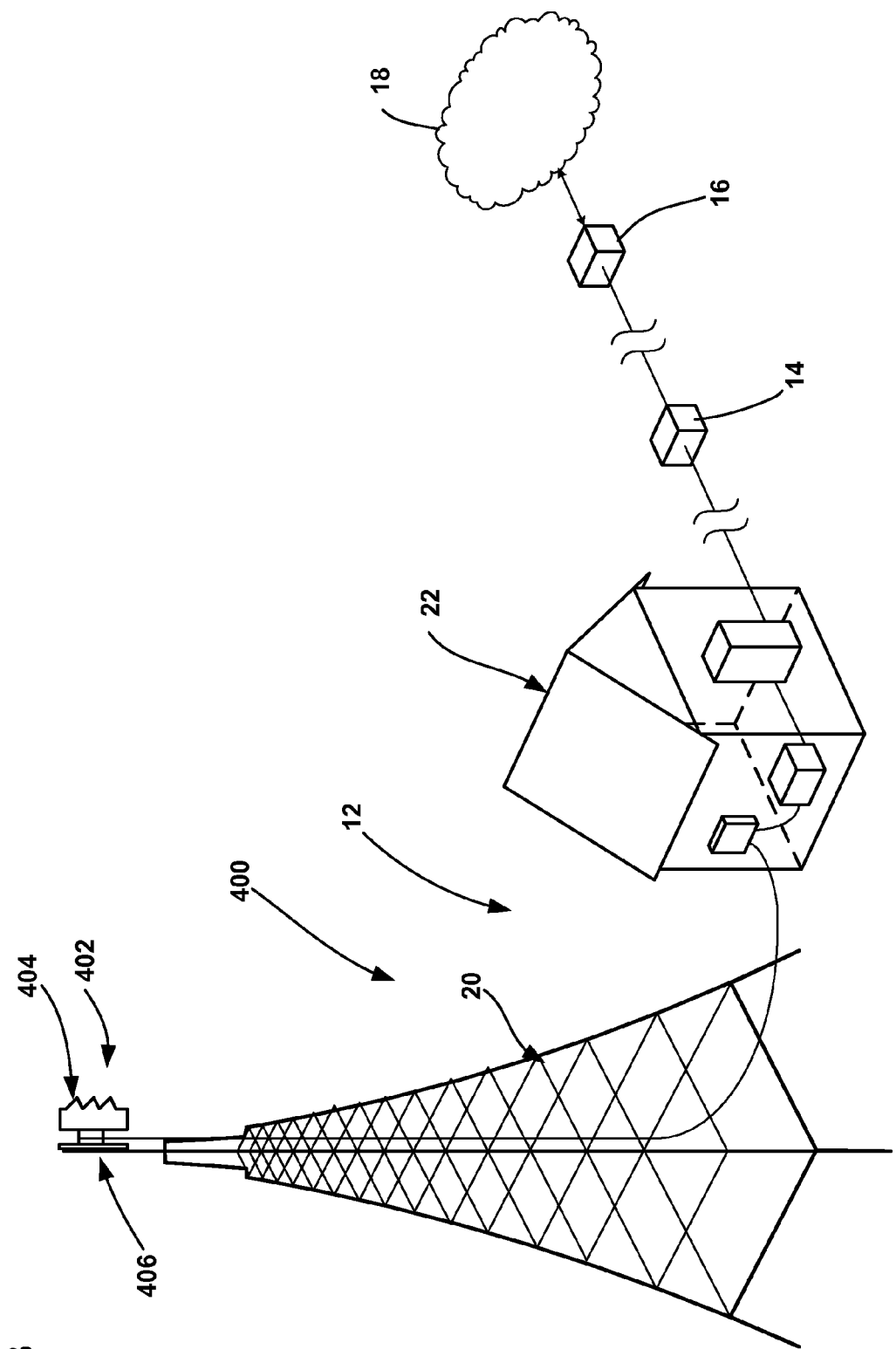
FIG. 13 is an alternate embodiment of a telecommunications network having exemplary features of aspects in accordance with the principles of the present disclosure.

Referring now to FIG. 13, an alternate embodiment of a telecommunications network 400 is shown. In the depicted embodiment, the telecommunications network 400 includes the cell site 12, the demarcation point 14, the backhaul 16 and the core network 18.

The cell site 12 includes the tower 20 and the hut 22. The tower 20 includes a multi-service terminal 402 mounted to the tower 20. In the depicted embodiment, the multi-service terminal 402 is mounted to the top portion 26 of the tower 20. The multi-service terminal assembly 402 includes a housing 404 and a cable spool 406. A terminal suitable for use as the multi-service terminal 402 has been described in U.S. Patent Application Publication No. 2009/0317047, which is hereby incorporated by reference in its entirety.

Figure 14:
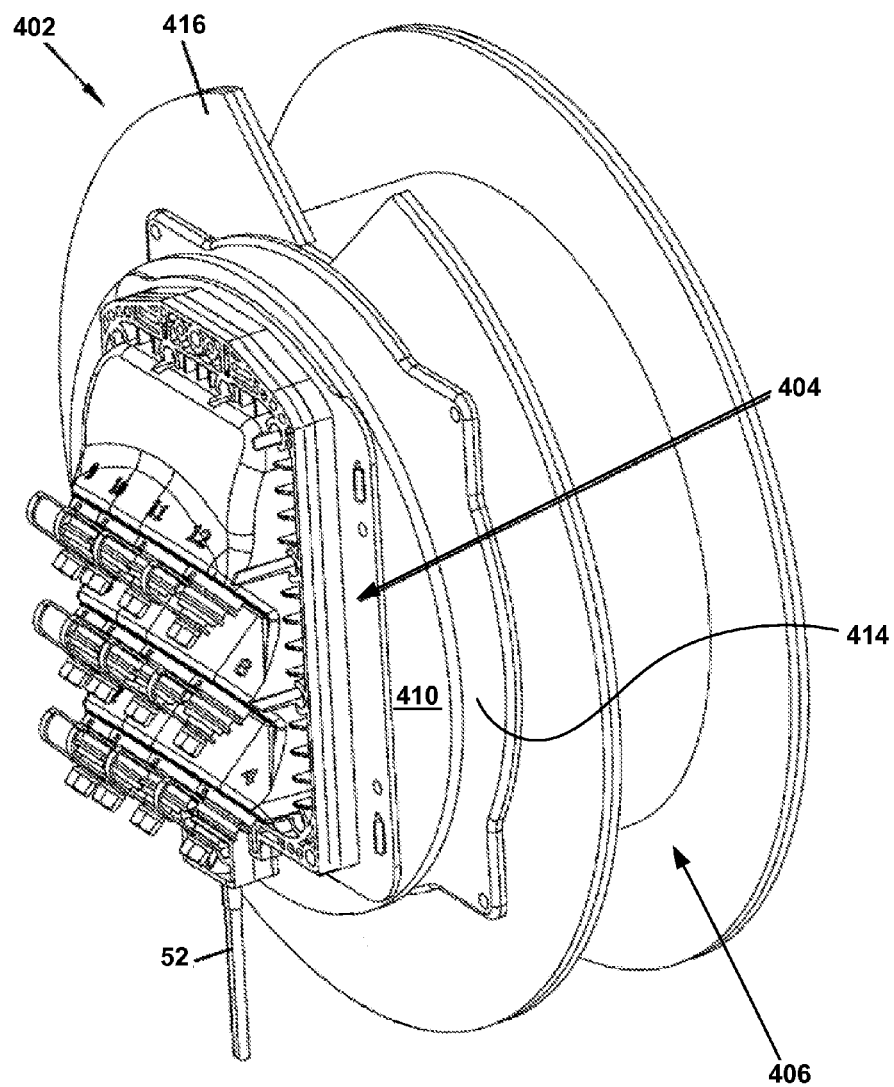
FIG. 14 is a perspective view of a multi-service terminal suitable for use with the telecommunications network of FIG. 13.

Referring now to FIG. 14, the multi-service terminal assembly 402 is shown. The cable spool 406 includes a spooling portion 408 around which the fiber optic cable 52 is coiled or wrapped. In one embodiment, the cable spool 406 is engaged to the housing 404 of the multi-service terminal assembly 402. In another embodiment, the cable spool 406 is removably engaged to the housing 404.

The cable spool 406 is engaged to the housing 404 so that the cable spool 406 and the housing 404 rotate in unison about an axis of a mounting bracket to pay out the fiber optic cable 52. In one embodiment, after the fiber optic cable 52 has been paid out from the cable spool 406, the cable spool 406 is removed from the housing 404.

Figure 15:
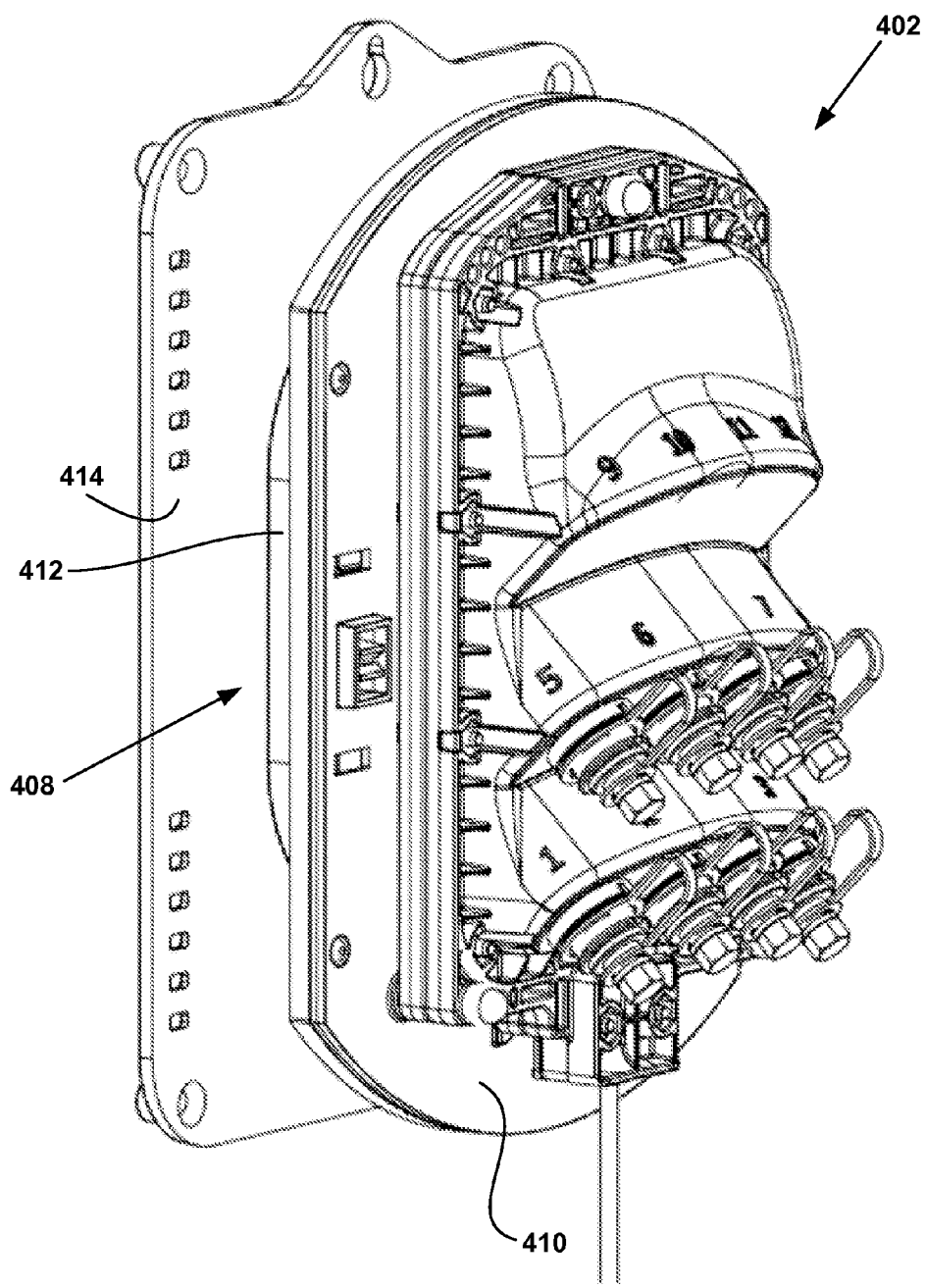
FIG. 15 is a perspective view of the multi-service terminal of FIG. 14.

Referring now to FIGS. 14 and 15, the multi-service terminal assembly 402 includes a slack storage spool 408 engaged to the housing 404. The slack storage spool 408 includes a first flange 410, a drum portion 412 and a second flange 414.

The first flange 410 is engaged to the housing 404. The second flange 414 is adapted for engagement with a front radial flange 416 of the cable spool 406. In the subject embodiment, a plurality of fasteners (e.g., bolts, screws, rivets, etc.) is used to engage the second flange 414 to the front radial flange 416 of the cable spool 406.

The drum portion 412 is disposed between the first flange 410 and the second flange 414. In the subject embodiment, the drum portion 412 is releasably engaged to the first flange 410. The releasable engagement is potentially advantageous as it allows the drum portion 412 and the second flange 414 to be removed from the housing 404 in the event all of the fiber optic cable 52 is unwound from the cable spool 406 and the slack storage spool 408. In one embodiment, the drum portion 412 is in snap-fit engagement with the first flange 410. In another embodiment, the drum portion 412 is engaged with the first flange 410 by fasteners (e.g., bolts, screws, etc.).

The drum portion 412 is configured to receive the fiber optic cable 52 so that the fiber optic cable 52 wraps around an outer surface of the drum portion 412. In the subject embodiment, the drum portion 412 is cylindrical in shape having a cross-section that is generally oblong. In another embodiment, the drum portion 412 has a cross-section that is generally oval in shape.

Figure 16:
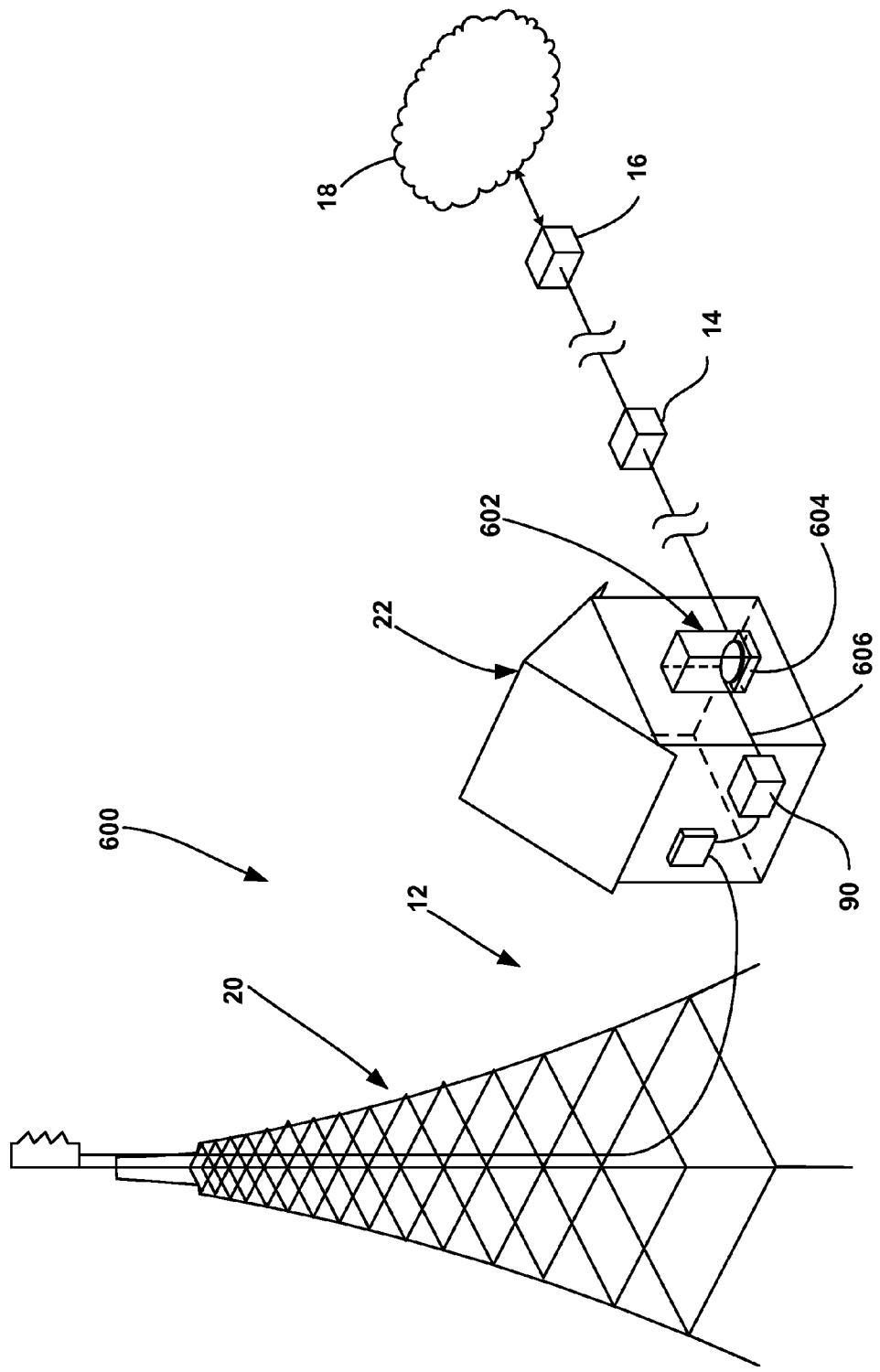
FIG. 16 is an alternate embodiment of a telecommunications network having exemplary features of aspects in accordance with the principles of the present disclosure.

Referring now to FIG. 16, an alternate embodiment of a telecommunications network 600 is shown. In the depicted embodiment, the telecommunications network 600 includes the cell site 12, the demarcation point 14, the backhaul 16 and the core network 18.

The cell site 12 includes the tower 20 and the hut 22. A telecommunications equipment rack 602 is disposed in the hut 22. In the depicted embodiment, the telecommunications equipment rack 602 includes a cable drawer assembly 604. The cable drawer assembly 604 includes a length of fiber optic cable 606 that can be paid out from the cable drawer assembly. In the depicted embodiment, the fiber optic cable 606 extends from the cable drawer assembly 604 to the base transceiver station 90.

Figure 17:
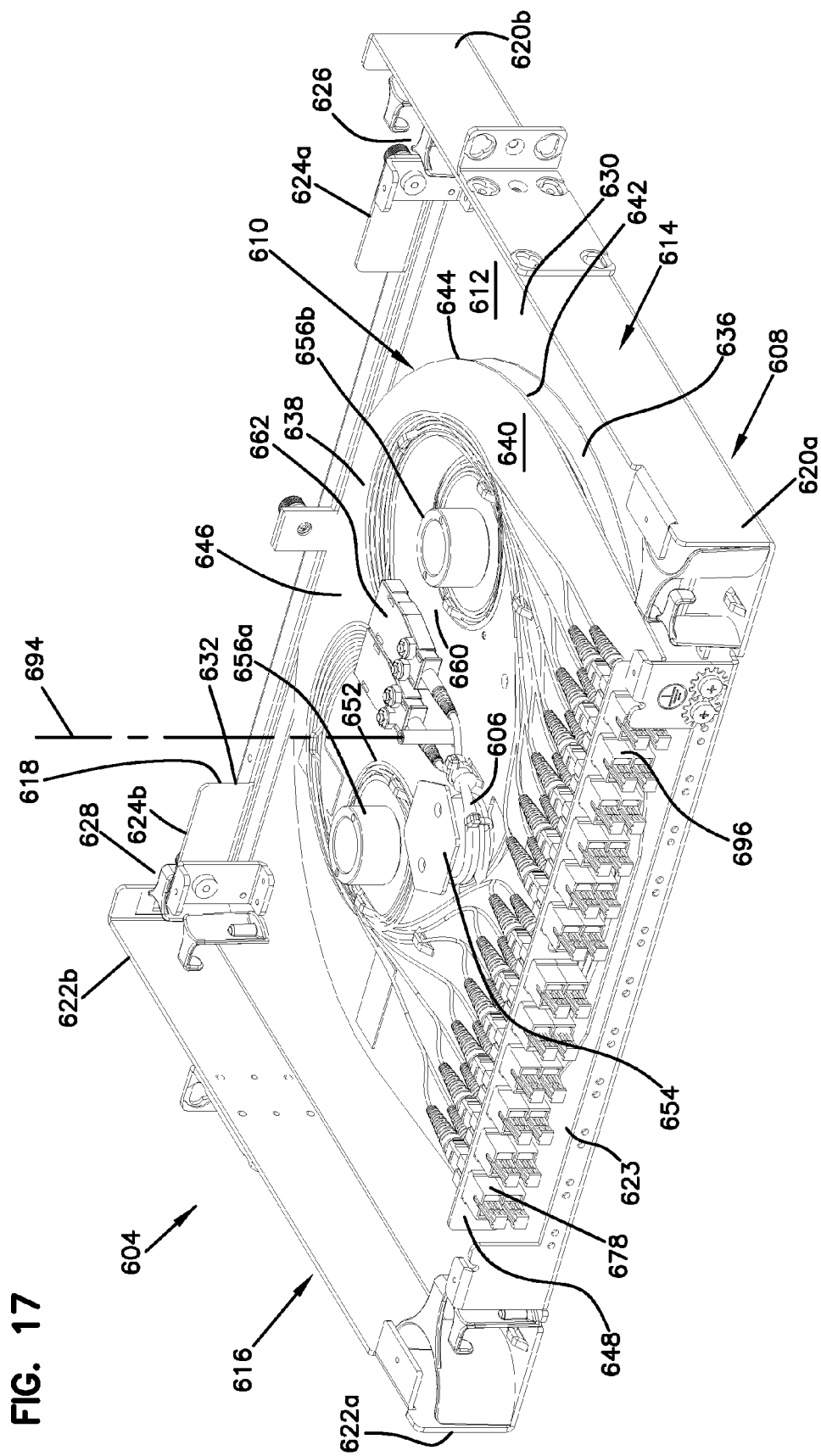
FIG. 17 is a perspective view of a cable drawer assembly suitable for use in the telecommunications network of FIG. 16.
Figure 18:
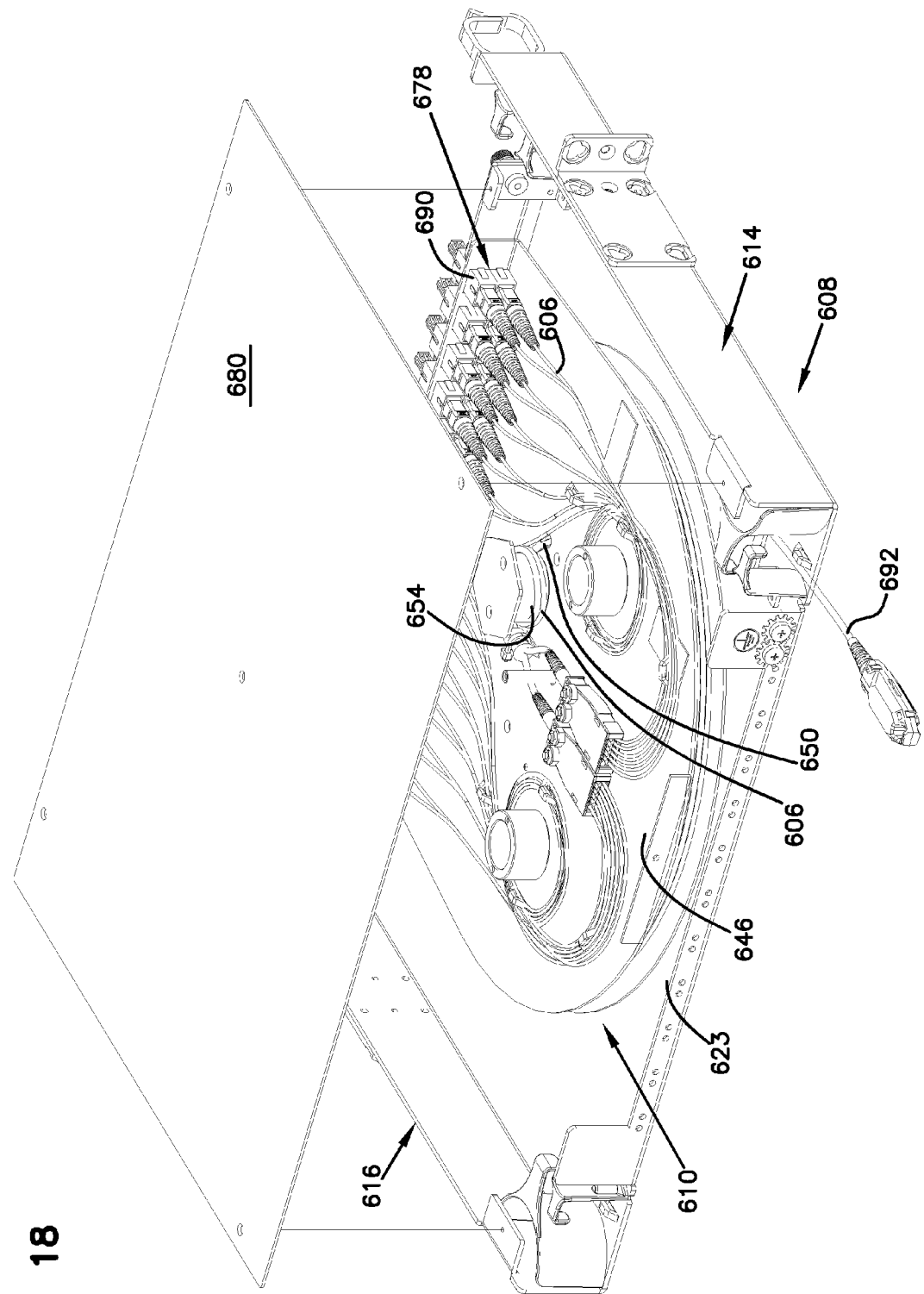
FIG. 18 is a perspective view of the cable drawer assembly of FIG. 17.

Referring now to FIGS. 17 and 18, the cable drawer assembly 604 is shown. A cable drawer assembly suitable for use with the telecommunications equipment rack 602 has been described in U.S. patent application Ser. Nos. 61/227,247 and 61/261,657, the disclosures of which are hereby incorporated by reference in their entirety. The cable drawer assembly 604 includes a drawer, generally designated 608, and a cable spool, generally designated 610, rotatably disposed in the drawer 608.

The drawer 608 includes a base panel 612, a first sidewall 614, an oppositely disposed second sidewall 616, and a third sidewall 618. The first, second and third sidewalls 614, 616, 618 extend outwardly from the base panel 612. In one aspect of the present disclosure, the first, second and third sidewalls 614, 616, 618 extend outwardly in a direction that is generally perpendicular to the base panel 612. In the depicted embodiment of FIG. 17, the first sidewall 614 is generally parallel to the second sidewall 616. The first sidewall 614 includes a first end 620a and an oppositely disposed second end 620b while the second sidewall 616 includes a first end 622a and an oppositely disposed second end 622b. The first ends 620a, 622a of the first and second sidewalls 614, 616 and the base 612 cooperatively define a first opening 623 of the drawer 608.

The third sidewall 618 is disposed between the second ends 620b, 622b of the first and second sidewalls 614, 616 and oriented so that the third sidewall 618 is generally perpendicular to the first and second sidewalls 614, 616. The third sidewall 618 includes a first end 624a and an oppositely disposed second end 624b.

In the depicted embodiment of FIG. 17, the first and second ends 624a, 624b of the third sidewall 618 do not abut the second ends 620b, 622b of the first and second sidewalls 614, 616, respectively. The second end 620b of the first sidewall, the first end 624a of the third sidewall 618 and the base panel 612 define a first passage 626 while the second end 622b of the second sidewall 616, the second end 624b of the third sidewall 618 and the base panel 612 define a second passage 628. Each of the first and second passages 626, 628 provides access to an interior region 630 of the drawer 608, which is cooperatively defined by the first, second and third sidewalls 614, 616, 618 and the base panel 612.

The third sidewall 618 defines an access opening 632. The access opening 632 is disposed between the first and second ends 624a, 624b of the third sidewall 618. The access opening 632 extends through the third sidewall 618. In one aspect of the present disclosure, the access opening 632 is a generally U-shaped opening.

The cable spool 610 is rotatably disposed in the interior region 630 of the drawer 608. In one aspect of the present disclosure, the cable spool 610 includes a first flange 636, an oppositely disposed second flange 638 and a drum disposed between the first and second flanges 636, 638. The fiber optic cable 606 is wrapped around the drum of the cable spool 610.

The second flange 638 includes a first surface 640, an oppositely disposed second surface 642 that is disposed adjacent to the drum, and an outer peripheral side 644. The second flange 638 further includes a cable management portion 646 and an adapter bulkhead portion 648.

The cable management portion 646 includes a cable pass-thru 650 that extends through the first and second surfaces 640, 642 of the second flange 638. The cable pass-thru 650 provides a passage through which an end portion of the fiber optic cable 606 can pass from the drum through the second flange 638 so that the portion of the fiber optic cable 606 is disposed in the cable management portion 646.

The cable management portion 646 includes a strain relief spool 654. The strain relief spool 654 is disposed on the second surface 642 of the second flange 638 adjacent to the cable pass-thru 650. The strain relief spool 654 is adapted to receive a portion of the end portion of the fiber optic cable 606. The portion of the fiber optic cable 606 is wrapped around the strain relief spool 654. The strain relief spool 654 protects the end portion of the fiber optic cable 606 disposed in the cable management portion 646 from being disrupted in the event that the fiber optic cable 606 is pulled after all of the fiber optic cable 606 disposed around the drum of the cable spool 610 has been paid out.

The cable management portion 646 further includes a plurality of cable management spools 656 around which the end portions 652 of the fiber optic cable 606 are coiled. In the depicted embodiment of FIGS. 17 and 18, the end portions 652 of the fiber optic cable 606 are loosely coiled around the cable management spools 656. This loose coiling provides excess lengths of individual fibers of the end portions of the fiber optic cable 606. In one aspect of the present disclosure, the cable management portion 646 includes a first cable management spool 656a and a second cable management spool 656b.

The cable management portion 646 further includes a fan-out mounting area 660 that is adapted to receive a fan-out 662. In one aspect of the present disclosure, the fan-out mounting area 660 includes a plurality of fan-outs 662. The fan-outs 662 serve as a transition location between the fiber optic cable 606 and the individual upjacketed fibers of the fiber optic cable 606. In one aspect of the present disclosure, the fan-out mounting area 660 includes a plurality of fasteners 664 (e.g., screws, nuts, etc.) that retains the fan-out 662 in the fan-out mounting area 660.

The cable management portion 646 further includes a plurality of cable anchors 676. The cable anchors 676 extend outwardly from the second surface 642 of the second flange 638 and define an opening through which a cable tie can pass. The cable tie is adapted for retaining the fiber optic cable 606 in the cable management portion 646.

The adapter bulkhead portion 648 extends outwardly from the cable management portion 646 of the second flange 638. In one aspect of the present disclosure, the adapter bulkhead portion 648 is about perpendicular to the cable management portion 646. The adapter bulkhead portion 648 is generally planar in shape and forms a chordal side surface of the second flange 638 of the cable spool 610. In one aspect of the present disclosure, the adapter bulkhead portion 648 is generally parallel to the first opening 623 of the drawer 608 when the cable spool 610 is in a first stored position (best shown in FIG. 17).

The adapter bulkhead portion 648 is adapted to receive a plurality of adapters 678. The adapter bulkhead portion 648 defines a plurality of adapter openings in which the plurality of adapters 678 is mounted.

The cable drawer assembly 604 further includes a cover 680. The cover 680 is adapted for engagement with the drawer 608. When the cover 608 is engaged to the drawer 608, the cover 680 is generally parallel to the base panel 612 and extends between the first and second sidewalls 614, 616.

The use of the cable drawer assembly 604 will be described. With the fiber optic cable 606 coiled around the drum of the cable spool 610 and the end portion of the fiber optic cable 606 engaged with a first side 690 of the adapters 678 in the adapter bulkhead portion 648, a second end 692 of the fiber optic cable 606 can be paid out. As the second end 692 is paid out, the cable spool 610 rotates in the drawer 608 about a rotation axis 694. After the second end 692 of the fiber optic cable 606 has been paid out, a second side 696 of the adapters 678 can be engaged with a connectorized cable (e.g., patch cable, jumper cable, etc.). In one aspect of the present disclosure, the entire length of the fiber optic cable 606 is not completely deployed during pay out. In this scenario, the residual length of fiber optic cable 606 (which is equal to the entire length minus the deployed length) remains coiled around the drum of the cable spool 610.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A cell site of a telecommunications network comprising:
a tower;
a multi-service terminal mounted to the tower, the multi-service terminal having:
a housing;
a plurality of adapters mounted to the housing, each of the adapters including:
an outer port accessible from outside the housing and an inner port accessible from inside the housing;
a plurality of remote transceivers in communication with the outer ports of the adapters of the multi-service terminal; and
a base transceiver station in communication with the multi-service terminal.

2. The cell site of claim 1, wherein the multi-service terminal is mounted to a top portion of the tower.

3. The cell site of claim 1, wherein the multi-service terminal includes a cable spool disposed on an exterior of the housing.

4. The cell site of claim 1, wherein the cell site includes an enclosure in communication with multi-service terminal and the base transceiver station.

5. The cell site of claim 4, wherein the enclosure includes a housing defining an interior region, a fiber optic cable stub being disposed in the interior region, the fiber optic cable stub having a first end portion and an oppositely disposed second end portion, the first end portion including a multi-fiber connector, the second end portion including a plurality of single fiber connectors.

6. The cell site of claim 5, wherein a connectorized end of a fiber optic cable of the multi-service terminal is connected to the multi-fiber connector in the interior region of the enclosure.

7. The cell site of claim 4, wherein the enclosure includes a housing and a cable spool disposed on an exterior surface of the housing.

8. The cell site of claim 4, wherein the cell site includes a hut, the enclosure being disposed on an exterior surface of the hut.

9. A telecommunications network comprising:
a cell site including:
a tower;
a multi-service terminal mounted to the tower, the multi-service terminal having:
a housing;
a plurality of adapters mounted to the housing, each of the adapters including an outer port accessible from outside the housing and an inner port accessible from inside the housing;
a plurality of remote transceivers in communication with the outer ports of the adapters of the multi-service terminal;
a base transceiver station in communication with the multi-service terminal; and
a backhaul in communication with the base transceiver station.

* * * * *